(12) United States Patent
Takano et al.

(10) Patent No.: US 9,221,983 B2
(45) Date of Patent: Dec. 29, 2015

(54) COATING COMPOSITION AND SHEET USING SAME

(75) Inventors: Yoko Takano, Tokyo (JP); Takeshi Kobayashi, Tokyo (JP); Takehiko Hiroshima, Tokyo (JP); Jun Kaneki, Okayama (JP); Hiroaki Takahashi, Okayama (JP); Akiko Inoue, Okayama (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 40 days.

(21) Appl. No.: 13/519,172

(22) PCT Filed: Dec. 28, 2010

(86) PCT No.: PCT/JP2010/073766
§ 371 (c)(1),
(2), (4) Date: Jun. 26, 2012

(87) PCT Pub. No.: WO2011/081201
PCT Pub. Date: Jul. 7, 2011

(65) Prior Publication Data
US 2012/0288718 A1  Nov. 15, 2012

(30) Foreign Application Priority Data

Dec. 28, 2009 (JP) ................. 2009-298802
Mar. 30, 2010 (JP) ................. 2010-079753
Mar. 30, 2010 (JP) ................. 2010-079754
Jul. 30, 2010 (JP) ................. 2010-173027

(51) Int. Cl.
*G02B 5/22* (2006.01)
*B32B 27/06* (2006.01)
(Continued)

(52) U.S. Cl.
CPC ............ *C09D 7/1241* (2013.01); *C08G 18/672* (2013.01); *C09D 5/1618* (2013.01);
(Continued)

(58) Field of Classification Search
CPC ........ C08G 18/42; C08G 18/44; C08G 18/62; C08G 18/672; C08G 18/4277; C08G 18/6225; C09D 5/1637; C09D 5/1618; C09D 7/1241; C09D 175/16; C08K 5/34; C08K 5/3475; C08K 5/3492; Y10T 428/31551
USPC ........................................ 428/423.1; 252/589
See application file for complete search history.

(56) References Cited

U.S. PATENT DOCUMENTS 5,426,131 A   6/1995  Katsamberis
6,147,163 A  11/2000  Boisseau et al.
(Continued)

FOREIGN PATENT DOCUMENTS

EP   0 942 052   9/1999
EP   2 011 837   1/2009
(Continued)

OTHER PUBLICATIONS

Extended European Search Report dated Jun. 18, 2013, including a Supplementary European Search Report and Search Opinion, for EP Application No. 10841056.4-1303/2520626 (PCT/JP2010/073766).
(Continued)

*Primary Examiner* — Thao T Tran
(74) *Attorney, Agent, or Firm* — Fitch, Even, Tabin & Flannery LLP

(57) ABSTRACT

Provided are a coating composition which provides a sheet with a visible light transmission property and a UV ray-blocking performance in addition to an excellent self-cleaning performance and a persistence thereof, a weatherability and a persistence thereof and a transparency and a sheet having a surface protective layer formed by the above composition. They are a coating composition comprising an ionizing radiation-curable resin and a hydrophilizing agent such as a silicate compound and alkyl silicate and a sheet having a surface protective layer formed by cross-linking and curing the above coating composition.

11 Claims, 2 Drawing Sheets

(51) Int. Cl.

| | | |
|---|---|---|
| *C09D 7/12* | (2006.01) | |
| *C09D 175/16* | (2006.01) | |
| *C08G 18/67* | (2006.01) | |
| *C09D 5/16* | (2006.01) | |
| *C08K 5/3475* | (2006.01) | |
| *C08K 5/3492* | (2006.01) | |

(52) U.S. Cl.
CPC ............ *C09D5/1637* (2013.01); *C09D 175/16* (2013.01); *C08K 5/3475* (2013.01); *C08K 5/3492* (2013.01); *Y10T 428/31551* (2015.04)

(56) References Cited

U.S. PATENT DOCUMENTS

| 6,271,293 | B1 | 8/2001 | Karuga et al. | |
| 6,306,502 | B1 * | 10/2001 | Fukushima et al. | 428/412 |
| 6,309,708 | B1 | 10/2001 | Mohri et al. | |
| 2007/0112224 | A1 | 5/2007 | Krafft et al. | |

FOREIGN PATENT DOCUMENTS

| JP | 61-31330 | | 2/1986 |
| JP | 02-028267 | | 1/1990 |
| JP | 04-261847 | | 9/1992 |
| JP | 05-098189 | | 4/1993 |
| JP | 2869443 | | 1/1999 |
| JP | 11-34249 | | 2/1999 |
| JP | 11-148022 | | 6/1999 |
| JP | 2000-006325 | | 1/2000 |
| JP | 2000-178504 | | 6/2000 |
| JP | 2001-18334 | | 1/2001 |
| JP | 2001-123125 | | 5/2001 |
| JP | 2001-315270 | | 11/2001 |
| JP | 2001-316603 | | 11/2001 |
| JP | 2002234917 | A * | 8/2002 |
| JP | 2003-180169 | | 7/2003 |
| JP | 2004-224834 | | 8/2004 |
| JP | 2004-272197 | | 9/2004 |
| JP | 2007-245442 | | 9/2007 |
| JP | 2007-314549 | A | 12/2007 |
| JP | 2007-314594 | | 12/2007 |
| JP | 2008-13771 | | 1/2008 |
| JP | 2008-105372 | A | 5/2008 |
| JP | 2009-007514 | | 1/2009 |
| JP | 2009-66966 | | 4/2009 |
| JP | 2009-66967 | | 4/2009 |
| JP | 2009-84327 | | 4/2009 |
| JP | 2011-074192 | | 4/2011 |
| WO | WO 00/09620 | | 2/2000 |
| WO | WO 2005/087845 | | 9/2005 |

OTHER PUBLICATIONS

Extended European Search Report dated Jun. 18, 2013, including a European Search Report or a partial European Search Report and Search Opinion, for EP Application No. 13153593.2-1303/2594616.

Japanese Official Action dated Jul. 8, 2014, for JP Application No. 2010-079753.

Chinese Official Action dated Apr. 3, 2014, for CN Application No. 201080057557.9.

Japanese Official Action dated Dec. 2, 2014, for JP Application No. 2010-286738.

English language machine translation of JP 2001-018334.

English language machine translation of JP 2002-234917.

Office Action mailed Jul. 14, 2015, for Japanese Application No. 2010-286738, 4 pages.

Japanese Official Action dated Aug. 12, 2014, for JP Application No. 2010-286737.

\* cited by examiner

COATING COMPOSITION AND SHEET USING SAME

BACKGROUND OF THE INVENTION

The present invention relates to a coating composition and a sheet prepared by using the same.

RELATED ART

Entrance doors and exterior materials in general housings, interiors and exteriors such as floor materials, outside walls and the like in public facilities, buildings and structures installed outdoors are exposed daily to direct rays and wind and weather, and therefore a very severe weatherability is required to sheets used for protecting the surfaces of these interior and exterior materials and structures. Various sheets are investigated in order to enhance the weatherability (refer to patent documents 1 to 3).

In all of the patent documents 1 to 3, the weatherability is attempted to be enhanced by adding additives such as a light stabilizer, a UV absorber and the like to the protective layer. However, when the addition amounts of the additives contained in the above protective layer are elevated, these additives bleed out due to a compatibility thereof with a binder resin forming the protective layer to cause stickiness. On the other hand, if the addition amounts stay in such an extent that they do not bleed out, the satisfactory performances of the additives are not obtained, and the problem that the sheets which are satisfactory in terms of a weatherability are not obtained has been involved therein.

On the other hand, contaminants such as dusts, coarse particulates, oily matters and the like are liable to be adhered on the interior and exterior materials and the structures described above, and when they are exposed to wind and weather in a state in which the above contaminants are adhered thereon, the contaminants remain in the form of lines along rain stripes, so that the problem that the appearance thereof is notably reduced is involved therein. Accordingly, an antifouling property is required as well to sheets used for the surfaces of the interior and exterior materials and the structures described above. Usually, used for enhancing the antifouling property is a method in which a hydrophilicity of the protective layer is enhanced by using an additive such as silica and the like in addition to a method in which silicones and fluorine compounds are blended. However, the problem that a large amount of the additives has to be used in order to secure the sufficiently high antifouling property and the problems that this allows the additives to drop off from the protective layer and that the hydrophilicity is reduced due to scratches have been involved therein. Further, it is described in a patent document 4 that an organosilicate compound is employed as an additive. Also in the above case, however, the problems of requiring a large amount of the additive, dropping off of the additive and a reduction in the hydrophilicity due to scratches each described above have not come to be solved.

Further, a weatherability, an antifouling property and a self-cleaning capability of the sheets used for the interior and exterior materials and the structures described above are paid attentions, and they have come to be requested to be applied to such uses that a transparency is required as is the case with, for example, a protective sheet for window glasses, vinyl houses and the like. It is generally known that when a light absorber and a UV absorber are added to a protective layer, a reduction in the transparency and decoloration such as yellowing are brought about, and in production of sheets for application in which a transparency is required, the sheets stay in a situation in which severer issue is imposed.

Films comprising an olefin base film and vinyl chloride base film as a base film are developed in large numbers as agricultural films used for vinyl houses and the like (refer to, for example, a patent document 5). In general, however, it is known that a weatherability of olefin base films is not sufficiently high, and the problem that they can not stand use over a long period of time is present. Further, a method in which a coating film is formed on an olefin base film by coating to provide it with functions such as a weatherability and the like is employed as well, but films which can meet at the same time, various performances described above which are required to agricultural films have not been found out.

Further, agricultural films comprising a fluorine base resin film as a base material are known as films having an excellent weatherability (refer to, for example, a patent document 6). However, when a fluorine base resin film is used as a base material, it is hard and therefore is not satisfactory in terms of a workability, and since it has basically a quality of having a mold releasing property, it is not satisfactory in terms of a film formability by coating and a persistence thereof and has involved the problem that it can not meet providing a functionality according to vegetables.

Patent document 1: Japanese Patent Application Laid-Open No. 245442/2007
Patent document 2: Japanese Patent Application Laid-Open No. 66966/2009
Patent document 3: Japanese Patent Application Laid-Open No. 66967/2009
Patent document 4: Japanese Patent No. 2869443
Patent document 5: Japanese Patent Application Laid-Open No. 180169/2003
Patent document 6: Japanese Patent Application Laid-Open No. 34249/1999

EXPLANATION OF CODES

Figure 1:
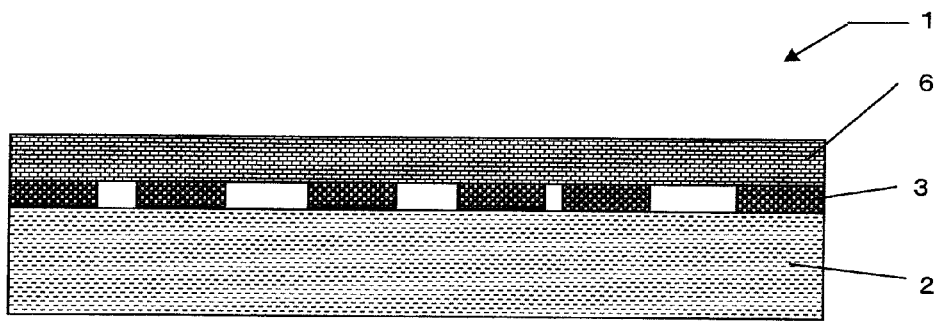
FIG. 1 is a schematic drawing showing a cross section of the sheet in the present invention.

1. Sheet
2. Base material
3. Pattern-printed layer
3a. Picture layer
3b. Colored layer
4. Transparent resin layer
5. Primer layer
6. Surface protective layer
7. Rear face primer layer
8. Adhesive layer
9. Colored resin layer An object of the present invention is to solve the above problems and provide a coating composition which provides a sheet with a visible light transmission property and a UV ray-blocking performance in addition to an excellent self-cleaning performance and a persistence thereof, a weatherability and a persistence thereof and a transparency and a sheet having a surface protective layer formed by the above composition.

Intense researches repeated by the present inventors in order to achieve the object described above have resulted in finding that the problems described above can be solved by a coating composition comprising a specific ionizing radiation-curable resin or a specific silicate compound and having the following constitution and a sheet prepared by using the same. The present invention has been completed based on the above knowledge.

That is, the essential points of the present invention are shown below.

1. A coating composition comprising caprolactone base urethane (meth)acrylate, a triazine base UV absorber and a hindered amine base light stabilizer having a reactive functional group A1.
2. The coating composition according to the item 1 described above, further comprising a silicate compound having a reactive functional group B1 or alkyl silicate.
3. A coating composition comprising an ionizing radiation-curable resin and a silicate compound, wherein the above silicate compound has a reactive functional group B2.
4. The coating composition according to the item 3 described above, wherein the ionizing radiation-curable resin is caprolactone base urethane (meth)acrylate.
5. A coating composition comprising caprolactone base urethane (meth)acrylate, a silicate compound having a reactive functional group B3 or alkyl silicate and a triazine base UV absorber and/or a benzotriazole base UV absorber.
6. A coating composition comprising an ionizing radiation-curable resin and a silicate compound, wherein the above silicate compound is alkyl silicate having a methoxy group.
7. The coating composition according to the item 6 described above, wherein the ionizing radiation-curable resin is caprolactone base urethane (meth)acrylate.
7. The coating composition according to the item 6 or 7 described above, comprising a triazine base UV absorber and/or a hindered amine base light stabilizer.
8. A coating composition comprising an ionizing radiation-curable resin and a silicate compound, wherein the above silicate compound is alkyl silicate of an eicosamer to a 40-mer.
9. The coating composition according to the item 8 described above, wherein the ionizing radiation-curable resin is caprolactone base urethane (meth)acrylate.
10. The coating composition according to the item 8 or 9 described above, comprising a triazine base UV absorber and/or a hindered amine base light stabilizer.
11. A sheet having a surface protective layer prepared by cross-linking and curing the coating composition according to any of the items 1 to 10.
12. The sheet according to the item 11 described above, wherein it comprises at least a base material and a surface protective layer, and the above surface protective layer is provided on an outermost surface.
13. The sheet according to the item 11 or 12 described above, wherein primer layer is provided between the base material film and the surface protective layer.

According to the present invention, capable of being provided are a coating composition which provides a sheet with a visible light transmission property and a UV ray-blocking performance in addition to an excellent self-cleaning performance and a persistence thereof, a weatherability and a persistence thereof and a transparency and a sheet having a surface protective layer which is formed by the above composition.

BEST MODE FOR CARRYING OUT THE INVENTION

Coating Composition 1:

A first embodiment of the coating composition in the present invention (hereinafter referred to merely as the "coating composition 1") is a coating composition comprising caprolactone base urethane (meth)acrylate, a triazine base UV absorber and a hindered amine base light stabilizer having a reactive functional group A1. The respective components shall be explained below.

<<Caprolactone Base Urethane(Meth)Acrylate>>

The caprolactone base urethane (meth)acrylate used in the present invention is a resin having an ionizing radiation-curing property and can be obtained usually by reacting a caprolactone base polyol and organic isocyanate with hydroxy(meth)acrylate. In this connection, an ionizing radiation means a radiation having an energy quantum which can polymerize or cross-link molecules among electromagnetic waves and charged particle beam, and an ultraviolet ray (UV) or an electron beam (EB) is usually used. In addition thereto, electromagnetic waves such as an X ray, a γ ray and the like and charged particle beams such as an α ray, an ion beam and the like can be used as well.

In this respect, commercially available polyols can be used for the caprolactone base polyol, and they include polyols which have preferably two hydroxyl groups and which have a weight average molecular weight of preferably 500 to 3000, more preferably 750 to 2000. Further, polyols other than the caprolactone base, for example, polyols such as ethylene glycol, diethylene glycol, 1,4-butanediol, 1,6-hexanediol and the like can be used as well alone or in a mixture of plural kinds thereof in an optional proportion.

The organic polyisocyanate is preferably diisocyanate having two isocyanate groups, and it includes preferably isophoronediisocyanate, hexamethylenediisocyanate, 4,4'-dicyclohexylmethanediisocyanate, trimethylhexamethylenediisocyanate and the like from the viewpoint of inhibiting yellowing. Also, the hydroxy(meth)acrylate includes preferably 2-hydroxyethyl acrylate, 2-hydroxypropyl acrylate, caprolactone-modified 2-hydroxyethyl acrylate and the like.

The caprolactone base urethane (meth)acrylate can be synthesized by reacting these caprolactone base polyol and organic isocyanate with the hydroxy(meth)acrylate. A synthetic method thereof is preferably a method in which the caprolactone base polyol is reacted with the organic isocyanate to form a polyurethane prepolymer having —NCO groups (isocyanate groups) at both ends and in which the polyurethane prepolymer is then reacted with the hydroxy(meth)acrylate. The conditions of the reaction can be based on those of an ordinary method.

The caprolactone base urethane (meth)acrylate used in the present invention has a weight average molecular weight (weight average molecular weight reduced to polystyrene which is measured by a GPC method) of preferably 1000 to 10000, more preferably 2000 to 10000. That is, the caprolactone base urethane (meth)acrylate is preferably an oligomer. If the weight average molecular weight falls in the ranges (oligomer) described above, the processability is excellent, and the coating composition is provided with a suitable thixotropic property, so that the surface protective layer is readily formed.

<<Triazine Base UV Absorber>>

The triazine base UV absorber used in the present invention is preferably a hydroxyphenyltriazine base UV absorber. The above UV absorber includes preferably, for example, 2-(2-hydroxy-4-[1-octyloxycarbonylethoxy]phenyl)-4,6-bis (4-phenylphenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, 2,4-bis[2-hydroxy-4-butoxyphenyl]-6-(2,4-dibutoxyphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, 2-[4-[(2-hydroxy-3-(2'-ethyl)hexyl)oxy]-2-hydroxyphenyl]-4,6-bis(2,4-dimethylphenyl)-1,3,5-triazine and the like. They can be used alone or in combination of plural kinds thereof.

A content of the triazine base UV absorber is preferably 1 to 10 parts by mass, more preferably 3 to 10 parts by mass and further preferably 5 to 10 parts by mass based on 100 parts by mass of the caprolactone base urethane (meth)acrylate. If a content of the triazine base UV absorber falls in the ranges described above, the above absorber does not bleed out, and the sufficiently high UV absorbability is obtained, so that the excellent weatherability is obtained. In general, if 1 part by mass or more of a UV absorber based on 100 parts by mass of a binder resin is added, the above absorber bleeds out in a certain case, and therefore the more excellent UV absorbability has not so far been obtained if tried to be obtained. According to the present invention, however, combination of the triazine base UV absorber, the caprolactone base urethane (meth)acrylate and the prescribed light stabilizer has made it possible to obtain the excellent weatherability without allowing the UV absorber to bleed out even if adding the UV absorber in such a large amount as 1 part by mass or more.

<<Hindered Amine Base Light Stabilizer Having a Reactive Functional Group A1>>

In the hindered amine base light stabilizer used in the present invention, the reactive functional group A1 shall not specifically be restricted as long as it has a reactivity with the caprolactone base urethane (meth)acrylate and includes preferably, for example, functional groups having an ethylenical double bond such as a (meth)acryloyl group, a vinyl group, an allyl group and the like, and it is preferably at least one selected from them. Among them, the (meth)acryloyl group is preferred.

The above light stabilizer includes 1,2,2,6,6-pentamethyl-4-piperidyl methacrylate, bis(1,2,2,6,6-pentamethyl-4-piperidyl)sebacate, bis(2,2,6,6-pentamethyl-4-piperidyl)sebacate, bis(1,2,2,6,6-pentamethyl-4-piperidinyl)sebacate, methyl(1,2,2,6,6-pentamethyl-4-piperidinyl)sebacate, 2,4-bis[N-butyl-N-(1-cyclohexyloxy-2,2,6,6-tetramethylpiperidine-4-yl)amino]-6-(2-hydroxyethylamine)-1,3,5-triazine) and the like.

A content of the hindered amine base light stabilizer having a reactive functional group A1 is preferably 1 to 10 parts by mass, more preferably 3 to 10 parts by mass and further preferably 5 to 10 parts by mass based on 100 parts by mass of the caprolactone base urethane (meth)acrylate. If a content of the hindered amine base light stabilizer falls in the ranges described above, the above light stabilizer does not bleed out, and the sufficiently high light stability is obtained, so that the excellent weatherability is obtained.

<<Silicate Compound Having a Reactive Functional Group B1>>

In the present invention, the silicate compound is used, if desired, in order to provide a matter coated with the coating composition of the present invention with a self-cleaning property. The silicate compound used in the present invention shall not specifically be restricted as long as it is a silicate compound having a reactive functional group B1 having a reactivity with the caprolactone base urethane (meth)acrylate. The reactive functional group B1 includes preferably functional groups having an ethylenical double bond such as a (meth)acryloyl group, a vinyl group, an allyl group and the like, and it is preferably at least one selected from them. Among them, the (meth)acryloyl group is preferred.

The silicate compound having a reactive functional group B1 is Preferably a Compound Represented by the Following Formula (1):

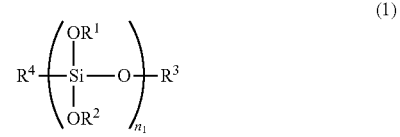

(1)

In Formula (1), $R^1$ to $R^3$ represent a hydrogen atom or an organic group having 1 to 10 carbon atoms, and plural $R^1$ and $R^2$ may be the same or different. Also, $R^4$ is a functional group containing a reactive functional group B1.

The organic group having 1 to 10 carbon atoms includes preferably an alkyl group, an alkenyl group, a cycloalkyl group, an aryl group, an aralkyl group and the like. The above groups may be or may not be substituted, and the alkyl group and the alkenyl group may be linear or branched. Among them, the alkyl group having 1 to 4 carbon atoms is more preferred.

Further, $n_1$ is preferably 1 to 30, more preferably 1 to 10. That is, the silicate compound having a reactive functional group α is preferably the silicate compound represented by Formula (1) or a condensation product thereof, and the condensation product is preferably a dimer to a 30-mer, more preferably a dimer to a decamer. When the hydrophilizing agent is a condensation product of the silicate compound, the preferred dimer to 30-mer or the more preferred dimer to decamer described above includes a case in which it is an average value.

To be more specific, the silicate compound is preferably a compound represented by the following Formula (2):

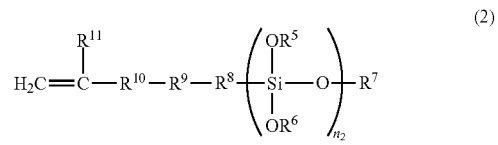

(2)

In Formula (2), $R^5$ to $R^7$ each are the same as $R^1$ to $R^3$. $R^{11}$ is the same as $R^1$ and is particularly preferably a hydrogen atom or methyl. Further, $R^9$ and $R^{10}$ represent a single bond or a divalent organic group. Also, $R^9$ represents a single bond, a carbonyl group (—CO—), an ether bond (—O—), an ester bond (—COO—), a thioether bond (—S—), an amide bond (—CONH—), an imino bond (—NH—), a carbonate bond (—OCOO—) or a group obtained by connecting a plurality of the above groups. The divalent organic group includes preferably an alkanediyl group, an alkenediyl group, an arylene group, an arylenealkanediyl group and the like. The above groups may be or may not be substituted, and the alkanediyl group and the alkenediyl group may be linear or branched. Among them, the alkanediyl group having 1 to 4 carbon atoms is more preferred. $R^9$ is more preferably the ester bond (—COO—).

Further, $n_2$ is the same as $n_1$ described above.

A content of the silicate compound having a reactive functional group B1 is preferably 1 to 15 parts by mass, more preferably 3 to 15 parts by mass and further preferably 5 to 15 parts by mass based on 100 parts by mass of the caprolactone base urethane (meth)acrylate. If a content of the silicate compound falls in the ranges described above, a good cross-linking state of the caprolactone base urethane (meth)acrylate is obtained. Further, since the surface protective layer formed by using the coating composition of the present invention comes to be provided with a suited hydrophilicity, the wetting property to water is enhanced, and the excellent self-cleaning property can be provided. That is, interior and exterior materials and buildings are exposed to wind and weather, but since the surface protective layer has a hydrophilicity, a thin film is liable to be formed on the above surface protective layer by rain water, and therefore contaminants themselves are inhibited from being stuck or contaminants stuck are liable to be removed.

<<Alkyl Silicate>>

In the present invention, the alkyl silicate is used, if desired, in order to provide a matter coated with the coating composition of the present invention with a self-cleaning property. The alkyl silicate may be any one as long as it has at least one alkoxyl group bonded to a Si atom, and it is preferably tetraalkyl silicate represented by the following Formula (3):

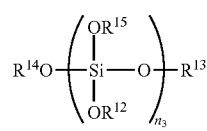

(3)

In Formula (3), $R^{12}$ to $R^{15}$ represent a hydrogen atom or a linear or branched alkyl group having 1 to 10 carbon atoms, and plural $R^{12}$ and $R^{15}$ may be the same or different. Also, all of $R^{12}$ to $R^{15}$ are not hydrogen atoms at the same time. $R^{12}$ to $R^{15}$ are preferably an alkyl group having 1 to 4 carbon atoms, more preferably an alkyl group having 1 and 2 carbon atoms from the viewpoint of enhancing the self-cleaning performance and the visible light transmission property.

The term $n_3$ is preferably 1 to 40, more preferably 10 to 30 and further preferably 10 to 20 from the viewpoint of enhancing the self-cleaning property. That is, the alkyl silicate is preferably the alkyl silicate represented by Formula (3) or a condensation product thereof, and the condensation product is preferably a dimer to a 40-mer, more preferably a decamer to a 30-mer and further preferably a decamer to an eicosamer. In the present invention, when the hydrophilizing agent is a condensation product of the silicate compound, the preferred dimer to 40-mer, the more preferred decamer to 30-mer or the further preferred decamer to eicosamer described above includes a case in which it is an average value. Accordingly, the condensation products comprising 40 or less-mers on average are included in the condensation products of the alkyl silicate of a dimer to a 40-mer which are preferably used in the present invention though the condensation products larger than a 40-mer are contained therein as is the case with, for example, alkyl silicate which is a mixture of a pentadecamer to a 45-mer and which is an eicosamer on average.

A weight average molecular weight thereof is preferably 150 to 4000, more preferably 1000 to 3000 and further preferably 1000 to 2000.

<<Various Additives>>

The coating composition of the present invention can contain various additives as long as the performances thereof are not inhibited. The various additives include, for example, a polymerization inhibitor, a cross-linking agent, an antistatic agent, an adhesion improving agent, an antioxidant, a leveling agent, a thixotropy-providing agent, a coupling agent, a plasticizer, a defoaming agent, a filler, a solvent and the like.

Coating Composition 2:

A second embodiment of the coating composition in the present invention (hereinafter referred to merely as the "coating composition 2") is a coating composition comprising an ionizing radiation-curable resin and a silicate compound, wherein the above silicate compound has a reactive functional group B2. The respective components shall be explained below.

<<Ionizing Radiation-Curable Resin>>

Those suitably selected from polymerizable monomers and polymerizable oligomers or prepolymers which have so far conventionally been used as ionizing radiation-curable resins can be used for the ionizing radiation-curable resin used in the second embodiment of the coating composition in the present invention. The resins which are less liable to bleed out and have a coating property in a proportion of 95 to 100% in terms of a solid matter content and which do not bring about curing shrinkage in curing are preferred from the viewpoint of obtaining the good curing characteristics. The representative examples of the above ionizing radiation-curable resin shall be described below. "(Meth)acrylate" means "acrylate" or "methacrylate".

The polymerizable monomer is suitably (meth)acrylate monomers having a radically polymerizable unsaturated group in a molecule, and among them, multifunctional (meth)acrylates having two or more ethylenically unsaturated bonds in a molecule are preferred. They may be used alone or in combination of two or more kinds thereof. The number of the functional groups is preferably 2 to 8, more preferably 2 to 6 and further preferably 3 to 4.

In the second embodiment of the coating composition in the present invention, monofunctional (meth)acrylates such as methyl(meth)acrylate and the like can suitably be used in combination with the multifunctional (meth)acrylate described above for the purpose of controlling a viscosity thereof as long as the object of the present is not damaged. The monofunctional (meth)acrylates may be used alone or in combination of two or more kinds thereof.

Next, the polymerizable oligomer includes preferably oligomers having radically polymerizable unsaturated group in a molecule, for example, oligomers of an epoxy(meth)acrylate base, a urethane (meth)acrylate base, polyether base urethane (meth)acrylate, caprolactone base urethane (meth)acrylate, a polyester(meth)acrylate base and a polyether (meth)acrylate base, and the oligomers of a urethane (meth)acrylate base are more preferred. Among the above oligomers, the multifunctional polymerizable oligomers are preferred, and the number of the functional groups is preferably 2 to 16, more preferably 2 to 8 and further preferably 2 to 6.

Further, the polymerizable oligomer includes, in addition to the above oligomers, highly hydrophobic polybutadiene (meth)acrylate base oligomers having a (meth)acrylate group in a side chain of a polybutadiene oligomer, silicone (meth)acrylate base oligomers having a polysiloxane bond in a principal chain, aminoplast resin (meth)acrylate base oligomers obtained by modifying an aminoplast resin having many reactive groups in a small molecule and oligomers having a cationic polymerizable functional group in a molecule such as novolak type epoxy resins, bisphenol A type epoxy resins, aliphatic vinyl ethers, aromatic vinyl ethers and the like. The above polymerizable oligomers may be used alone or in combination of two or more kinds thereof.

When a UV ray-curable resin is used as the ionizing radiation-curable resin, an initiator for photopolymerization is added preferably in a an amount of 0.1 to 5 parts by mass based on 100 parts by mass of the UV ray-curable resin. The initiator for photopolymerization can suitably be selected from initiators which have so far conventionally been used and shall not specifically be restricted.

<Caprolactone Base Urethane(Meth)Acrylate>

Among the polymerizable oligomers described above, the caprolactone base urethane (meth)acrylate is particularly preferred since the weatherability and a persistence thereof and the transparency in addition to the excellent self-cleaning property are obtained by combination with the silicate compound having a reactive functional group B2 described later. The caprolactone base urethane (meth)acrylate is the same as explained in the first embodiment of the coating composition.

<<Silicate Compound Having a Reactive Functional Group B2>>

In the second embodiment of the coating composition in the present invention, the silicate compound is used in order to provide a matter coated with the coating composition of the present invention with a self-cleaning property. The silicate compound used in the present invention shall not specifically be restricted as long as it is a silicate compound having a reactive functional group B2 which has a reactivity with the caprolactone base urethane (meth)acrylate. The silicate compound having a reactive functional group B2 is the same as the silicate compound having a reactive functional group B1 explained in the first embodiment of the coating composition.

<<Alkyl Silicate Compound>>

In the second embodiment of the coating composition in the present invention, the coating composition contains preferably the alkyl silicate compound. The alkyl silicate compound is the same as the alkyl silicate compound explained in the first embodiment of the coating composition, and in the second embodiment of the coating composition of the present invention, $n_3$ in Formula (3) is preferably 1 to 30, more preferably 5 to 15 from the viewpoint of enhancing the self-cleaning performance and a persistence thereof.

<<Hindered Amine Base Light Stabilizer>>

In the second embodiment of the coating composition in the present invention, the coating composition contains preferably a hindered amine base light stabilizer. The hindered amine base light stabilizer shall not be restricted as long as it is a hindered amine base light stabilizer, and it is preferably a hindered amine base light stabilizer having a reactive functional group A2. The hindered amine base light stabilizer having a reactive functional group A2 is the same as the hindered amine base light stabilizer having a reactive functional group A1 explained in the first embodiment of the coating composition.

<<Triazine Base UV Absorber>>

In the second embodiment of the coating composition in the present invention, the coating composition contains preferably a triazine base UV absorber. The triazine base UV absorber is the same as the triazine base UV absorber explained in the first embodiment of the coating composition.

<<Various Additives>>

In the second embodiment of the coating composition in the present invention, the coating composition can contain various additives as long as the performances thereof are not inhibited. The various additives include, for example, a polymerization inhibitor, a cross-linking agent, an antistatic agent, an adhesion improving agent, an antioxidant, a leveling agent, a thixotropy-providing agent, a coupling agent, a plasticizer, a defoaming agent, a filler, a solvent and the like.

Coating Composition 3:

A third embodiment of the coating composition in the present invention (hereinafter referred to merely as the "coating composition 3") is a coating composition comprising caprolactone base urethane (meth)acrylate, a silicate compound having a reactive functional group B3 or alkyl silicate and a triazine base UV absorber and/or a benzotriazole base UV absorber. The respective components shall be explained below.

<<Caprolactone Base Urethane (meth)acrylate>>

In the third embodiment of the coating composition in the present invention, the coating composition contains the caprolactone base urethane (meth)acrylate. This allows the weatherability and the visible light transmission property in addition to the excellent self-cleaning performance to be obtained. The caprolactone base urethane (meth)acrylate is the same as explained in the first embodiment of the coating composition.

<<Other Ionizing Radiation-Curable Resins>>

In the third embodiment of the coating composition in the present invention, those suitably selected from polymerizable monomers and polymerizable oligomers or prepolymers which have so far conventionally been used as ionizing radiation-curable resins can be used as the ionizing radiation-curable resin as long as the effects thereof are not inhibited. The above ionizing radiation-curable resins include preferably the ionizing radiation-curable resins explained in the third embodiment of the coating composition.

<<Silicate Compound Having a Reactive Functional Group B3 or Alkyl Silicate>>

In the third embodiment of the coating composition in the present invention, the coating composition contains the silicate compound having a reactive functional group B3 or the alkyl silicate as the hydrophilizing agent. Addition of the hydrophilizing agent makes it possible to obtain the excellent self-cleaning performance and the excellent visible light transmission property. The silicate compound having a reactive functional group B3 and the alkyl silicate each are the same as the silicate compound having a reactive functional group B1 and the alkyl silicate which have been explained in the first embodiment of the coating composition.

<<UV Absorber>>

In the third embodiment of the coating composition in the present invention, the coating composition contains the triazine base UV absorber and/or the benzotriazole base UV absorber as the UV absorber for the purpose of enhancing the weatherability, the UV ray-blocking performance and the weatherability-keeping property. In the third embodiment of the coating composition in the present invention, the triazine base UV absorber and the benzotriazole base UV absorber each can be used independently, and the triazine base UV absorber and the benzotriazole base UV absorber are used preferably in combination from the viewpoint of obtaining the excellent weatherability, the excellent UV ray-blocking performance and the excellent weatherability-keeping property. A blend mass ratio thereof is preferably 10:90 to 90:10, more preferably 30:70 to 70:30. If the triazine base UV absorber and the benzotriazole base UV absorber are used in combination, obtained are very excellent effects in terms of inhibiting activities of harmful insects and the weatherability-keeping property that the tensile strength is good even after stretched for a long time in the agricultural application as well as the weatherability.

In the third embodiment of the coating composition in the present invention, the UV absorbing performance can flexibly be met according to a large variety of applications. Among the triazine base UV absorbers and the benzotriazole base UV absorbers, use of, for example, the UV absorbers having a maximum absorption wavelength in a range of 250 to 400 nm makes it possible to hold off worms such as insects, harmful insects, moths and the like which have a flying property of progressing toward a light source having a wavelength in a UV region of the above range and makes it possible to inhibit activities of the above harmful insects by cutting off a prescribed UV region. Further, eggplants are indispensably irradiated with a UV ray having a wavelength of 300 to 380 nm for growth thereof, and selecting a UV absorber which absorbs the other UV rays while avoiding absorption of a UV ray of the above range makes it possible to prepare an agricultural film which is most suited to the application of growing eggplants.

<Triazine Base UV Absorber>

The triazine base UV absorber is the same as explained in the first embodiment of the coating composition.

<Benzotriazole Base UV Absorber>

The benzotriazole base UV absorber includes 2-ethylhexyl-3-[3-tert-butyl-4-hydroxy-5-(5-chloro-2H-benzotriazole-2-yl)phenyl]propionate, 2-2H-benzotriazole-2-yl)-6-(linear and side chain dodecyl)-4-methylphenol, 2-[5-chloro(2H)-benzotriazole-2-yl]-4-methyl-6-(tert-butyl)phenol, 2-(2H-benzotriazole-2-yl)-4,6-di-tert-pentylphenol, 2-(2'-hydroxy-5'-methylphenyl)benzotriazole, 2-(2'-hydroxy-3',5'-di-tert-butylphenyl)benzotriazole, 2-(2'-hydroxy-3'-tert-butyl-5'-methylphenyl)benzotriazole, 2-(2'-hydroxy-3',5'-di-tert-butylphenyl)-5-chlorobenzotriazole, 2-(2'-hydroxy-3'-(3",4",5",6"-tetrahydrophthalimidemethyl)-5'-methylphenyl)benzotriazole, 2-2-methylenebis(4-(1,1,3,3-tetramethylbutyl)-6-(2H-benzotriazole-2-yl)phenol, 2-(2'-hydroxy-3'-tert-butyl-5'-methylphenyl)-5-chlorobenzotriazole and the like. They can be used alone or in combination of plural kinds thereof.

A content of the UV absorber contained in the coating composition is preferably 1 to 25 parts by mass, more preferably 2 to 15 parts by mass and further preferably 3 to 10 parts by mass based on 100 parts by mass of the ionizing radiation-curable resin (total of caprolactone base urethane (meth)acrylate and the other ionizing radiation-curable resins which are used if desired). If a content of the UV absorber falls in the ranges described above, the above absorber does not bleed out, and the sufficiently high UV absorbability is obtained, so that the excellent weatherability is obtained.

<<Hindered Amine Base Light Stabilizer>>

In the third embodiment of the coating composition in the present invention, the coating composition further contains preferably a hindered amine base light stabilizer. It shall not be restricted as long as it is a hindered amine base light stabilizer, and it is preferably a hindered amine base light stabilizer having a reactive functional group A2. The hindered amine base light stabilizer having a reactive functional group A2 is the same as the hindered amine base light stabilizer having a reactive functional group A1 explained in the first embodiment of the coating composition.

<<Various Additives>>

In the third embodiment of the coating composition in the present invention, the coating composition can contain various additives as long as the performances thereof are not inhibited. The various additives include, for example, a polymerization inhibitor, a cross-linking agent, an antistatic agent, an adhesion improving agent, an antioxidant, a leveling agent, a thixotropy-providing agent, a coupling agent, a plasticizer, a defoaming agent, a filler, a solvent and the like.

Coating Composition 4:

A fourth embodiment of the coating composition in the present invention (hereinafter referred to merely as the "coating composition 4") is a coating composition comprising an ionizing radiation-curable resin and a silicate compound, wherein the above silicate compound is alkyl silicate having a methoxy group. The respective components shall be explained below.

<<Ionizing Radiation-Curable Resin>>

The ionizing radiation-curable resin shall not specifically be restricted, and capable of being used are transparent resins comprising a prepolymer (including an oligomer) and/or a monomer as a principal component which contain in a molecule, a radically polymerizable double bond capable of being subjected to polymerization cross-linking reaction by irradiating with an ionizing radiation such as a UV ray, an electron beam and the like. The above prepolymer and/or monomer can be used alone or in a mixture of a plurality thereof. The curing reaction is usually cross-linking curing reaction.

To be specific, the prepolymer or the monomer described above includes compounds having in a molecule, a radically polymerizable unsaturated group such as a (meth)acryloyl group, a (meth)acryloyloxy group and the like, a cationic polymerizable functional group such as an epoxy group and the like. Further, prepolymers of a polyene/thiol base obtained by combining polyenes with polythiols are preferred as well.

The prepolymer having a radically polymerizable unsaturated group includes, for example, polyester (meth)acrylate, urethane (meth)acrylate, epoxy(meth)acrylate, melamine (meth)acrylate, triazine (meth)acrylate, silicone (meth)acrylate and the like. In the present invention, particularly caprolactone base urethane (meth)acrylate is preferably used as the ionizing radiation-curable resin. When the caprolactone base urethane (meth)acrylate is used, a weatherability of the coating composition is more enhanced. A weight average molecular weight of the above prepolymers is preferably 1000 to 10000, particularly preferably 1000 to 5000.

The monomer having a radically polymerizable unsaturated group includes preferably, for example, monofunctional monomers such as methyl(meth)acrylate, 2-ethylhexyl (meth)acrylate, phenoxyethyl(meth)acrylate and the like. It include preferably, for example, multifunctional monomers such as diethylene glycol di(meth)acrylate, propylene glycol di(meth)acrylate, trimethylolpropane tri(meth)acrylate, trimethylolpropane ethylene oxide (meth)acrylate, dipentaerythritol tetra(meth)acrylate, dipentaerythritol penta(meth)acrylate, dipentaerythritol hexa(meth)acrylate and the like.

The prepolymer having a cationic polymerizable unsaturated group includes, for example, prepolymers of epoxy base resins such as bisphenol A type epoxy resins, novolak type epoxy resins and the like and vinyl ether base resins such as fatty acid base vinyl ethers, aromatic base vinyl ethers and the like. Also, the thiol includes, for example, polythiols such as trimethylolpropane trithioglycolate, pentaerythritol tetrathioglycolate and the like. The polyene includes, for example, polyenes obtained by adding allyl alcohol to both ends of polyurethane by diol and isocyanate.

<<Alkyl Silicate>>

The alkyl silicate shall not specifically be restricted as long as it has a methoxy group. To be specific, it is the same as the alkyl silicate explained in the first embodiment of the coating composition. In this regard, in the fourth embodiment of the coating composition, at least any one of $R^{12}$ to $R^{15}$ in formula (3) described above has to be methyl. That is, the alkyl silicate used in the fourth embodiment of the coating composition has to have a methoxy group.

In the fourth embodiment of the coating composition, the above alkyl silicates are preferably monomers to eicosamers, more preferably dimers to decamers. Also, a molecular weight thereof is preferably 150 to 2500, more preferably 250 to 1500.

A content of the alkyl silicate contained in the coating composition shall not be restricted, and the alkyl silicate described above is contained in an amount of preferably 1 to 20 parts by mass, more preferably 6 to 10 parts by mass based on 100 parts by mass of the ionizing radiation-curable resin. If a content of the alkyl silicate contained falls in the ranges described above, a better cross-linking of the ionizing radiation-curable resin is obtained, and the original performances (the scratch resistance, the solvent resistance and the like) of the resin are enhanced.

<<Additives>>

In the fourth embodiment of the coating composition, the coating composition can be blended, if necessary, with publicly known additives. The additives include a weather resistant agent such as a UV absorber, a light stabilizer and the like and a matting agent (gloss controlling agent). The UV absorber includes, for example, benzophenone base UV absorbers, benzotriazole base UV absorbers, triazine base UV absorbers and the like. The light stabilizer is, for example, suitably a hindered amine base light stabilizer. A content of the above weather resistant agents shall not be restricted, and the contents of both the UV absorber and the light stabilizer are preferably 1000 to 100000 ppm by weight. Particularly in the fourth embodiment of the coating composition, the triazine base UV absorber and/or the hindered amine base light stabilizer are preferably used.

The matting agent includes publicly known inorganic particles of silica and the like and organic pigments.

The coating composition of the present invention can be prepared by mixing the components described above. They are mixed by means of, for example, a publicly known kneading equipment such as a Banbury mixer, a kneader blender, Brabende Plastograph, a small-sized batch mixer, a continuous mixer, a mixing roll and the like.

Coating Composition 5:

A fifth embodiment of the coating composition in the present invention (hereinafter referred to merely as the "coating composition 5") is a coating composition which comprising an ionizing radiation-curable resin and a silicate compound, wherein the above silicate compound is alkyl silicate of an eicosamer to a 40-mer. The respective components shall be explained below.

<<Alkyl Silicate>>

The alkyl silicate used in the fifth embodiment of the coating composition in the present invention may be any one as long as it has at least one alkoxy group bonded to a Si atom and has to be a condensation product of an eicosamer to a 40-mer, and it is preferably a condensation product of the tetraalkyl silicate represented by Formula (3) described above. Also, in the fifth embodiment of the coating composition of the present invention, at least any one of $R^{12}$ to $R^{15}$ is preferably methyl. That is, the alkyl silicate used in the fifth embodiment of the coating composition of the present invention has preferably an alkoxyl group having 1 to 4 carbon atoms, more preferably methoxy and ethoxy and further preferably methoxy, and it has preferably at least one methoxy.

The alkyl silicate used in the fifth embodiment of the coating composition in the present invention is a condensation product of an eicosamer to a 40-mer, and therefore n3 in Formula (3) described above has to be 20 to 40. It is preferably 20 to 35, more preferably 20 to 30 from the viewpoint of obtaining the excellent self-cleaning property and the excellent transparency. That is, the alkyl silicate used in the present invention has to be a condensation product of an eicosamer to a 40-mer, and it is a condensation product of preferably an eicosamer to a 35-mer, more preferably an eicosamer to a 30-mer. In the fifth embodiment of the coating composition in the present invention, the eicosamer to the 40-mer, the eicosamer to the 35-mer or the eicosamer to the 30-mer includes a case in which it is an average value. Accordingly, the alkyl silicate of an eicosamer or higher polymer on average though the alkyl silicates of less than an eicosamer are contained therein as is the case with, for example, alkyl silicate which is a mixture of a pentadecamer to a 30-mer and which is a 25-mer on average is included in the alkyl silicate used in the fifth embodiment of the coating composition in the present invention.

A molecular weight of the alkyl silicate used in the fifth embodiment of the coating composition in the present invention is preferably 2500 to 4000, more preferably 2500 to 3500 and further preferably 2500 to 3000. In the present invention, the molecular weight includes a case in which it is an average value as is the case with the polymers described above.

A content of the alkyl silicate is preferably 1 to 20 parts by mass, more preferably 3 to 15 parts by mass and further preferably 6 to 10 parts by mass based on 100 parts by mass of the ionizing radiation-curable resin from the viewpoints that the excellent self-cleaning property and the excellent transparency can be obtained and that a state of better cross-linking curing in the ionizing radiation-curable resin can be obtained.

<<Ionizing Radiation-Curable Resin>>

Those suitably selected from polymerizable monomers and polymerizable oligomers or prepolymers which have so far conventionally been used as ionizing radiation-curable resins can be used for the ionizing radiation-curable resin used in the fifth embodiment of the coating composition in the present invention. The resins which are less liable to bleed out and have a coating property in an extent of 95 to 100% in terms of a solid matter content and which are less liable to bring about curing shrinkage in curing are preferred from the viewpoint of obtaining the good curing characteristics.

The above ionizing radiation-curable resin is the same as explained in the second embodiment of the coating composition in the present invention.

<Caprolactone Base Urethane (Meth)Acrylate>

Among the polymerizable oligomers described above, the caprolactone base urethane (meth)acrylate is particularly preferred since the weatherability and a persistence thereof and the transparency in addition to the excellent self-cleaning property are obtained by combining with alkyl silicate. The caprolactone base urethane (meth)acrylate is the same as explained in the first embodiment of the coating composition.

<<UV Absorber>>

In the fifth embodiment of the coating composition in the present invention, the coating composition contains a UV absorber for the purpose of enhancing the weatherability, the UV ray-blocking performance and the weatherability-keeping property. The UV absorber includes preferably a triazine base UV absorber, a benzotriazole base UV absorber and the like. In this connection, the triazine base UV absorber and the benzotriazole base UV absorber are the same as those explained respectively in the first embodiment and the third embodiment of the coating composition in the present invention. The triazine base UV absorber and the benzotriazole base UV absorber are used preferably in combination from the viewpoint of obtaining the excellent weatherability, the excellent UV ray-blocking performance and the excellent weatherability-keeping property, and a blend mass ratio thereof is preferably 10:90 to 90:10, more preferably 30:70 to 70:30.

In the fifth embodiment of the coating composition in the present invention, a content of the UV absorber contained in the coating composition is preferably 1 to 25 parts by mass, more preferably 2 to 15 parts by mass and further preferably 3 to 10 parts by mass based on 100 parts by mass of the ionizing radiation-curable resin. If a content of the UV absorber falls in the ranges described above, the above absorber does not bleed out, and the sufficiently high UV absorbing ability is obtained, so that the excellent weatherability and the excellent transparency are obtained.

<<Light Stabilizer>>

In the fifth embodiment of the coating composition in the present invention, the coating composition further contains a light stabilizer. The light stabilizer is preferably a hindered amine base light stabilizer, more preferably a hindered amine base light stabilizer having a reactive functional group A4. The hindered amine base light stabilizer having a reactive functional group A4 is the same as the hindered amine base light stabilizer having a reactive functional group A1 explained in the first embodiment of the coating composition.

<<Various Additives>>

In the fifth embodiment of the coating composition in the present invention, the coating composition can contain various additives as long as the performances thereof are not inhibited. The various additives include, for example, a polymerization inhibitor, a cross-linking agent, an antistatic agent, an adhesion improving agent, an antioxidant, a leveling agent, a thixotropy-providing agent, a coupling agent, a plasticizer, a defoaming agent, a filler, a solvent and the like.

Sheet 1:

A first embodiment of the sheet in the present invention (hereinafter referred to merely as the "sheet 1") has a surface protective layer which is obtained by cross-linking and curing the coating composition 1, and it shall not specifically be restricted as long as it has a surface protective layer. The sheet 1 of the present invention can be formed from the above surface protective layer alone, and preferred is an embodiment in which the surface protective layer obtained by cross-linking and curing the coating composition 1 is formed on a base material. The preferred application of the sheet 1 of the present invention includes applications requiring a transparency, an application to decorated sheets and the like, and the sheet of the present invention shall be explained below by application.

<<Applications Requiring a Transparency>>

First, a case in which the sheet 1 of the present invention is used for applications requiring a transparency such as a protective sheet for window glasses, vinyl houses and the like shall be explained.

<Base Material>

In the sheet (hereinafter referred to as the sheet 1α) of the present invention used for applications requiring a transparency, the base material used therefor is preferably a plastic film and a plastic sheet, and it includes preferably those comprising a polyolefin resin, a vinyl base resin, a polyester resin, an acryl resin, a polyamide resin, a cellulose base resin, a polystyrene resin, a polycarbonate resin, a polyallylate resin, a polyimide resin and the like.

The above base materials can be subjected, if desired, on one face or both faces to physical and chemical surface treatments including an oxidation method such as corona discharge treatment, chrome oxidation treatment, hot blast treatment, ozone•UV ray treatment and the like and a roughening method such as a sand blast method, a solvent treating method and the like in order to enhance an adhesive property with a layer provided thereon.

The above base materials may be subjected to treatments such as forming a primer layer and a rear face primer layer for reinforcing an interlayer adhesive property between the base material and the surface protective layer and an adhesive property with various adherends. A material used for forming the primer layer shall not specifically be restricted and includes acryl base resins, vinyl chloride/vinyl acetate copolymers, polyesters, polyurethanes, chlorinated polypropylene and the like. A material used for the rear face primer layer 7 is suitably selected according to the adherends.

Further, painting for adjusting the color and patterns in the viewpoint of the design may be formed in advance as long as the transparency is not inhibited.

A thickness of the base materials shall not specifically be restricted, and securing the durability and considering the general versatility, it falls in a range of usually 20 to 200 µm, preferably 30 to 150 µm.

<Surface Protective Layer>

The surface protective layer is a layer obtained by cross-linking and curing the coating composition 1 of the present invention. To be more specific, it is a layer formed by coating the coating composition 1 on the base material described above and cross-linking and curing it by irradiating with an ionizing radiation.

The coating composition 1 is coated by a publicly known method such as gravure coating, bar coating, roll coating, reverse roll coating, comma coating and the like, preferably gravure coating so that a thickness thereof after curing is set usually to 1 to 20 µm. Also, it is preferably 2 to 20 µm from the viewpoint of obtaining the excellent weatherability and a persistency thereof, the transparency and the antifouling property.

An uncured resin layer formed by coating the coating composition 1 of the present invention is cross-linked and cured by irradiating with an ionizing radiation such as an electron beam, a UV ray and the like, whereby it is turned into the surface protective layer. In this regard, when an electron beam is used as the ionizing radiation, an accelerating voltage thereof can suitably be selected according to the resin used and a thickness of the layer, and usually the uncured resin layer is cured preferably at an accelerating voltage of 70 to 300 kV.

An irradiation dose is preferably a dose in which a cross-linking density of the caprolactone base urethane (meth)acrylate is saturated, and it is selected in a range of usually 5 to 300 kGy (0.5 to 30 Mrad), preferably 10 to 50 kGy (1 to 5 Mrad).

The electron beam source shall not specifically be restricted, and capable of being used are various electron beam accelerating devices of, for example, a Cockroft-Walton type, a van de Graaf type, a resonance transformer type, an insulating core transformer type, a linear type, a Dynamitron type, a high frequency type and the like.

Also, when a UV ray is used as the ionizing radiation, a ray containing a UV ray having a wavelength of 190 to 380 nm is radiated. The UV ray source shall not specifically be restricted, and a high pressure mercury lamp, a low pressure mercury lamp, a metal halide lamp, a carbon arc lamp and the like.

Also, the surface protective layer may have concave parts. A method for providing concave parts on the surface protective layer shall not specifically be restricted, and they are provided by, for example, emboss processing. The emboss processing can be carried out by a usual method using a publicly known embossing equipment of a single layer type or a rotary type.

The sheet 1α thus obtained is provided with an excellent weatherability and a persistency thereof and a transparency, and it is provided with a more excellent antifouling property when the silicate compound described above is contained in the coating composition. It is suitably used for applications requiring a transparency such as a protective sheet for window glasses, PVC greenhouses and the like.

<<Decorated Sheet>>

The sheet 1 of the present invention is also suitably used as a decorated sheet. For example, the sheet 1α used for the applications requiring a transparency described above and the sheet 1α obtained by providing it with pictures can also be used as the decorated sheet. A more preferred embodiment of the decorated sheet shall be explained with reference to FIG. 1 to FIG. 3.

Figure 2:
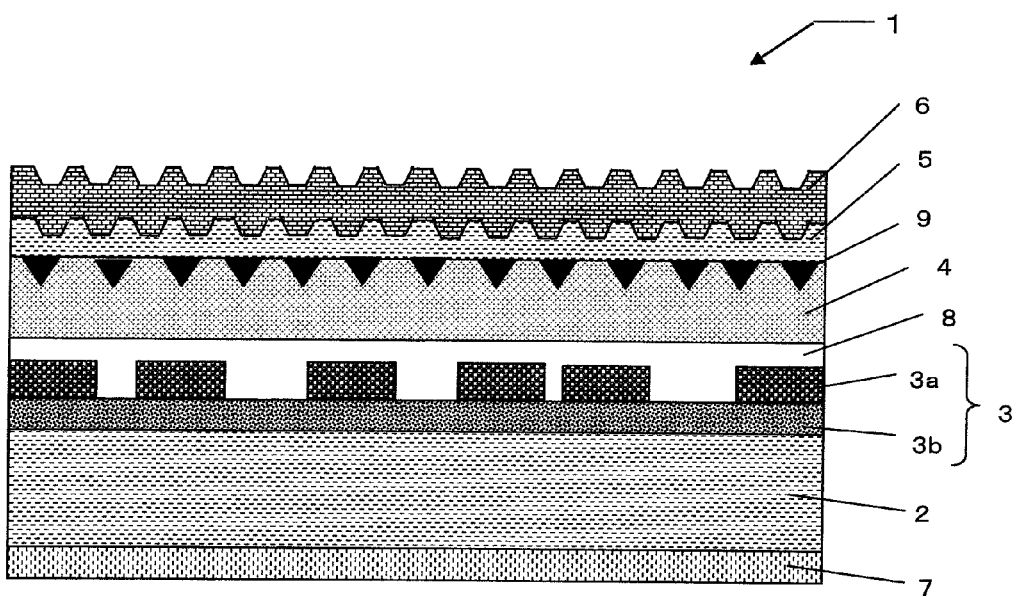
FIG. 2 is a schematic drawing showing another embodiment of a cross section of the sheet in the present invention.

FIG. 1 and FIG. 2 are schematic drawings showing the cross sections of the preferred embodiments of the sheet (hereinafter referred to as the sheet 1β) of the present invention which is used as the decorated sheet. In the embodiment shown in FIG. 1, a pattern-printed layer 3 and a surface protective layer 6 are laminated in order on a base material 2, and in the embodiment shown in FIG. 2, a pattern-printed layer 3, a transparent resin layer 4, a primer layer 5 and a surface protective layer 6 formed by cross-linking and curing the coating composition 1 of the present invention are laminated in this order on a base material 2. Also, in FIG. 2, a rear face primer layer 7 is provided on a rear surface of the base material 2, and an adhesive layer 8 is provided between the pattern-printed layer 3 and the transparent resin layer 4. Further, the transparent resin layer 4 has concave parts on a surface at a primer layer side, and a colored resin layer 9 subjected to wiping against the above concave parts is provided. The respective layers shall be explained below in detail.

<<Base Material 2>>

The base material 2 used in the sheet 1β of the present invention shall not specifically be restricted as long as it is used usually for a decorated sheet, and various papers, woven fabrics and non-woven fabrics of various fibers, plastic films, plastic sheets, metal foils, metal sheets, wooden boards of lumbers and the like, ceramic materials and the like can suitably be selected according to the applications. The above materials each may be used alone or in the form of laminated materials of optional combinations such as composite materials of papers and composite materials of papers and plastic films. Among them, the plastic films and the plastic sheets are preferred considering a processability, and above all, preferred are base materials of polyolefin base resins such as polyethylene, polypropylene, polybutene, polymethylpentene, ethylene/propylene copolymers, ethylene/propylene/butene copolymers, polyolefin base thermoplastic elastomers and the like. Considering a processability, polypropylene and the polyolefin base thermoplastic elastomers are preferred.

The polypropylene base resins are preferably homogeneous polypropylene resins, random polypropylene resins, block polypropylene resins and copolymers having a polypropylene crystalline part and comprising α-olefin having 2 to 20 carbon atoms other than propylene. In addition thereto, they include as well preferably propylene-α-olefin copolymers containing 15 mole % or more of a comonomer of ethylene, 1-butene, 4-methyl-1-pentene, 1-hexene or 1-octene.

The polyolefin base thermoplastic elastomer is preferably an elastomer obtained by mixing isotactic polypropylene as a hard segment and atactic polypropylene as a soft segment in a mass ratio of 80:20.

The base material of the polyolefin base resin can be obtained by, for example, a calendar method, an inflation method, a T die extrusion method and the like.

A thickness of the base material 2 shall not specifically be restricted, and it falls in a range of preferably 50 to 150 μm, more preferably 50 to 120 μm from the viewpoints of a processability, a flexibility, a strength and the like.

The base material 2 can be subjected to physical or chemical surface treatment as is the case with the base material of the sheet 1α described above, and a primer layer can be provided as well. Further, the base material can be colored by using a pigment and a dye. A coloring mode of the base material sheet includes transparent coloring and translucent coloring (masking coloring), and they can be selected according to the applications thereof.

<Pattern-Printed Layer 3>

The pattern-printed layer 3 shown in FIGS. 1 and 2 is provided to endow the sheet 1 of the present invention with a decorative property, and it comprises preferably a picture layer 3a and a colored layer 3b. When a color of the base material 2 is used as it is and does not have to be masked as described later, only the picture layer 3a may be provided, and on the other hand, when a pattern is not required, only the colored layer 3b may be provided.

The pattern-printed layer 3 can be formed by a publicly known printing method such as gravure printing, silk screen printing, offset printing, gravure offset printing, ink jet printing and the like by using usually an ink.

The picture layer 3a is provided to endow the base material 2 with a decorative property, and it is formed by printing various patterns using an ink by means of a printer. The patterns include woodgrain patterns, pebble patterns imitating a surface of rocks such as marble patterns (for example, travertine marble patterns), fabric patterns imitating texture and cloth-like patterns, tiling patterns, block working patterns and the like, and they include as well patterns such as marqueteries, patch works and the like which are obtained by combining the above patterns. These patterns are formed by polychromic printing using process colors of usual yellow color, red color, blue color and black color, and in addition thereto, they are formed as well by polychromic printing using plates of the respective colors constituting the patterns.

Inks prepared by suitably mixing a colorant such as a pigment, a dye and the like, an extender pigment, a solvent, a stabilizer, a plasticizer, a catalyst, a curing agent and the like with a binder are used as a picture ink used for the picture layer 3a.

The binder resin can suitably be selected from publicly known binders such as thermoplastic resins, thermosetting resins, ionizing radiation-curable resins and the like according to the physical properties required and the printing aptitude. Capable of being used are, for example, single substances or mixtures comprising cellulose base resins such as nitrocellulose, cellulose acetate, cellulose acetate propionate and the like; acryl resins such as polymethyl (meth)acrylate, polybutyl(meth)acrylate, methyl(meth)acrylate/butyl(meth)acrylate/2-hydroxyethyl(meth)acrylate copolymers and the like; and in addition thereto, urethane resins, vinyl chloride-vinyl acetate copolymers, polyester resins, alkyd resins and the like.

The above resins can be used alone or in a mixture of two or more kinds thereof.

Used as the colorant are inorganic pigments such as carbon blacks (Japanese inks), iron black, titan white, antimony white, chrome yellow, titan yellow, iron oxide red, cadmium red, ultramarine blue, cobalt blue and the like, organic pigments or dyes such as quinacridone red, isoindolinone yellow, phthalocyanine blue and the like, metallic pigments comprising flaky foils of aluminum, brass and the like, pearlescent (pearl) pigments comprising flaky foils of titanium dioxide-coated mica, basic lead carbonate and the like.

The solvent (or dispersant) includes, for example, petroleum base organic solvents such as hexane, heptane, octane, toluene, xylene, ethylbenzene, cyclohexane, methylcyclohexane and the like; ester base organic solvents such as ethyl acetate, butyl acetate, 2-methoxyethyl acetate, 2-ethoxyethyl acetate and the like; alcohol base organic solvents such as methyl alcohol, ethyl alcohol, normal propyl alcohol, isopropyl alcohol, isobutyl alcohol, ethylene glycol, propylene glycol and the like; ketone base organic solvents such as acetone, methyl ethyl ketone, methyl isobutyl ketone, cyclohexanone and the like; ether base organic solvents such as diethyl ether, dioxane, tetrahydrofuran and the like; chlorine base organic solvents such as dichloromethane, carbon tetrachloride, trichloroethylene, tetrachloroethylene and the like; inorganic solvents such as water and the like. The above solvents (or dispersants) can be used alone or in a mixture of two or more kinds thereof.

Further, a cross-linking agent may be added to the picture ink. The cross-linking agent includes isocyanate group-containing compounds, epoxy group-containing compounds, carbodiimide group-containing compounds, oxazoline group-containing compounds, silanol group-containing compounds and the like, and the isocyanate group-containing compounds are preferred.

The colored layer 3b is usually a uniform and even layer which coats the base material 2 over a whole surface and which is provided, if desired, for the purpose of enhancing a designing property of the sheet 1. It is called as well a masking layer or a whole solid layer. It is provided to endow a surface of the base material 2 with a intended color. It is formed usually in a translucent color in many cases, but it is formed as well in a colored transparent color in a certain case to use efficiently patterns which the base material is provided with. Also, in a case where the white base material 2 is used efficiently and a case where the base material 2 itself is suitably colored, the colored layer 3b does not have to be formed.

The same inks as those used for the picture layer 3a can be used as the ink used for the colored layer 3b.

<Transparent Resin Layer 4>

The transparent resin layer 4 shown in FIG. 2 is provided to protect the pattern-printed layer 3 in the sheet 1 of the present invention and endow the sheet of the present invention with a weatherability. The transparent resin layer 4 shall not be restricted as long as it is transparent and includes any of a colorless transparent layer, a colored transparent layer and a translucent layer.

A layer formed by, for example, a thermoplastic resin can suitably be used as the transparent resin layer 4. To be specific, capable of being listed are soft, semi-hard or hard polyvinyl chloride, polyethylene terephthalate, polybutylene terephthalate, polyamide, polyethylene, polypropylene, ethylene/vinyl acetate copolymers, ethylene/acrylic acid copolymers, ethylene acrylic ester copolymers, ionomers, acrylic esters, methacrylic esters and the like. In the present invention, polyolefin base resins such as polypropylene and the like are particularly preferred for the transparent resin layer 4.

The transparent resin layer 4 may be colored if necessary. In this case, a colorant (pigment or dye) can be added to the above thermoplastic resins to color them. Publicly known or commercially available pigments or dyes can suitably be used as the colorant. At least one or two or more kinds thereof can be selected. Also, an addition amount of the colorant can suitably be set according to the desired colors.

Further, a UV absorber (UVA) and a light stabilizer are preferably added as a weatherability-improving agent to the transparent resin layer 4. The UV absorber (UVA) absorbs a harmful UV ray to enhance a long term weatherability and a stability of the decorated sheet of the present invention. Also, the light stabilizer (HALS) in itself hardly absorbs a UV ray but scavenges efficiently harmful free radicals generated by a UV ray energy to thereby stabilize the decorated sheet.

The UV absorber may be any of inorganic absorbers and organic absorbers, and titanium oxide, cerium oxide, zinc oxide and the like which have an average particle diameter of 5 to 120 nm can preferably be used as the inorganic UV absorber. Also, UV absorbers of a benzotriazole base, a triazine base, a benzophenone base, a salicylate base, an acrylonitrile base and the like can preferably be listed as the organic UV absorber. Among them, the triazine base UV absorbers which have a high UV ray-absorbing ability and which are less liable to be degraded by a high energy such as a UV ray and the like are more preferred. The triazine base UV absorbers include preferably those used for the coating composition of the present invention described above.

The light stabilizer includes preferably such the foregoing hindered amine base light stabilizers (HALS) as contained in the coating composition.

Also, reactive UV absorbers and light stabilizers each having a polymerizable group such as a (meth)acryloyl group and the like in a molecule can also be used as the UV absorber and the light stabilizer.

A content of the UV absorber in the transparent resin layer 4 falls in a range of usually 0.1 to 1 part by mass, preferably 0.3 to 0.8 part by mass based on 100 parts by mass of the resin constituting the transparent resin layer 4. If it is 0.1 part by mass or more, the decorated sheet of the present invention can be provided with a sufficiently high weatherability, and if it is 1 part by mass or less, bleeding out is not brought about.

A content of the light stabilizer in the transparent resin layer 4 falls in a range of usually 0.05 to 0.8 part by mass, preferably 0.1 to 0.5 part by mass based on 100 parts by mass of the resin constituting the transparent resin layer 4. If it is 0.05 part by mass or more, the decorated sheet of the present invention can be provided with a sufficiently high weatherability, and if it is 0.8 part by mass or less, bleeding out is not brought about.

Also, various additives such as a filler, a delusterant (matting agent), a flame retardant, a lubricant, an antistatic agent, an antioxidant, a soft component (for example, rubber) and the like may be contained in the transparent resin layer 4.

A method for forming the transparent resin layer 4 shall not specifically be restricted, and various methods can be used. Capable of being employed is, for example, any of a method in which a sheet or film formed in advance is laminated on an adjacent layer, a method in which a resin composition capable of forming the transparent resin layer 4 is molten and extruded to thereby coat it on an adjacent layer and a method in which the transparent resin layer 4 is laminated together with an adjacent layer.

In the present invention, the transparent resin layer 4 is formed preferably by melt extrusion, and the transparent resin layer 4 is coated preferably by melting and extruding a polyolefin base resin. To be specific, the adhesive layer 8 is formed in advance on the pattern-printed layer 3, and a polypropylene base thermoplastic elastomer is coated on the above adhesive layer 8 by melting and extruding, whereby the transparent resin layer 4 can suitably be formed. A method for melting and extruding can be carried out according to, for example, a publicly known method using a T die.

A thickness of the transparent resin layer 4 can suitably be set according to the applications and the use method of the finished product, and usually it is preferably 20 to 250 µm, particularly preferably 50 to 200 µm.

Transparent Resin Layer Concave Part:

The transparent resin layer 4 may have concave parts as shown in FIG. 1. A method for providing the transparent resin layer 4 with the concave parts shall not specifically be restricted, and they are provided by, for example, emboss processing. The emboss processing may be carried out by a usual method using a publicly known embossing equipment of a single layer type or a rotary type, and in addition thereto, it may be carried out as well by a method (so-called doubling emboss method) in which the emboss processing is carried out at the same time in a step of laminating the transparent resin layer 4 on the pattern-printed layer 3.

A surface (front surface) and/or a rear surface of the transparent resin layer 4 can be subjected, if necessary, to corona discharge treatment in order to enhance an adhesive property with an adjacent layer. The method and the conditions of the corona discharge treatment can conformed to those of a publicly known method.

<Colored Resin Layer 9>

It is preferred in terms of enhancing the designing property and the weatherability that the concave parts provided on the transparent resin layer 4 described above are subjected to wiping processing to form a colored resin layer 9. The wiping processing means processing in which a colored ink composition is filled into the concave parts provided by the emboss processing while wiping a surface thereof by a doctor blade.

The colored ink composition is obtained preferably by dissolving (or dispersing) a publicly known colorant (dye or pigment) in a solvent (or a dispersant) together with polycarbonate base urethane (meth)acrylate, polyester base urethane (meth)acrylate or a resin comprising polycarbonate base urethane (meth)acrylate and (meth)acryl polyol which is a binder resin. The same colorant and solvent as those described above in the pattern-printed layer can be used for the colorant and the solvent contained in the colored ink composition.

The polycarbonate base urethane (meth)acrylate described above as the binder resin is a resin obtained by radically polymerizing a (meth)acryl monomer using as a radical polymerization initiator, a polycarbonate base polyurethane high polymer obtained by reacting polycarbonatediol with diisocyanate.

In this respect, the diisocyanate includes aromatic isocyanates, aliphatic isocyanates, alicyclic isocyanates and adducts and polymers thereof, and they can be used alone or in combination of two or more kinds thereof. Among them, preferred are aliphatic isocyanates such as hexamethylenediisocyanate and the like and alicyclic isocyanates such as isophoronediisocyanate, hydrogenated xylylenediisocyanate and the like.

The acryl monomer includes preferably (meth)acrylic acid and alkyl(meth)acrylates in which an alkyl group has 1 to 6 carbon atoms, and they can be used alone or in combination of two or more kinds thereof.

A mass ratio of a (meth)acryl component and a urethane component in the polycarbonate base urethane (meth)acrylate shall not specifically be restricted, and a mass ratio of the urethane component:the (meth)acryl component falls in a range of preferably 80:20 to 20:80, more preferably 70:30 to 30:70 in terms of the weatherability and the solvent resistance. If the contents of the acryl component and the urethane component fall in the ranges described above, the excessively hard coating film is prevented from being formed, and the sufficiently high processing aptitude is obtained. The problem that white lines (whitening) are produced on a surface of the resin in bending processing is not brought about.

The ester base urethane (meth)acrylate is a resin obtained by radically polymerizing a (meth)acryl monomer using as a radical polymerization initiator, a polyester base polyurethane high polymer obtained by reacting polyesterdiol with diisocyanate. The diisocyanate and the (meth)acryl monomer are suitably selected from those used for the polymerization of the polycarbonate base urethane (meth)acrylate described above.

An acryl polyol is obtained by introducing a hydroxyl group into the (meth)acryl monomer described above. It can be synthesized, for example, by copolymerizing the (meth)acryl monomer described above with hydroxy(meth)acrylate such as 2-hydroxyethyl(meth)acrylate, 2-hydroxy-3-phenoxypropyl (meth)acrylate and the like. These (met)acryl polyols play a function of a cross-linking agent.

A mass ratio of the polycarbonate base urethane (meth)acrylate to the (meth)acryl monomer falls in a range of preferably 100:0 in which the polycarbonate base urethane (meth)acrylate is used alone to 10:90, more preferably 100:0 to 30:70. If it falls in the above ranges, the sufficiently high weatherability is obtained. If the polycarbonate base urethane (meth)acrylate is used alone, not only the weatherability is reduced, but also since this is reacted with isocyanate, an adhesive property thereof with the ionizing radiation-curable resin is changed with the passage of time, and the stable performances are not exerted in a certain case.

The colored resin layer 9 is formed, as described above, by introducing the ink composition into the concave parts of the transparent resin layer 4. The designing effect is enhanced by a synergistic effect of the colored resin layer 9 formed in the concave parts and the pattern-printed layer 3. In particular, a design closer to an actual wood grain can be expressed by forming the colored resin layer in the concave parts of wood grain conduit groove irregularities, and this can enhance the commercial value. Further, the UV absorber (UVA) and the light stabilizer (HALS) are added, as described above, to the ink composition used for wiping processing, whereby the colored resin layer 9 can be provided with a weatherability.

<Adhesive Layer 8>

The adhesive layer 8 has a function to even out irregularities formed by the pattern-printed layer 3 and enhance an adhesive property of the transparent resin layer 4 with the base material 2, and it comprises a transparent layer.

An ink prepared by suitably mixing a binder with, if necessary, an extender filler, a solvent, a stabilizing agent, a plasticizer, a catalyst, a UV absorber, a light stabilizer, a curing agent and the like is used as the ink for forming the adhesive layer 8. The above binder shall not specifically be restricted, and acryl/polyurethane base copolymers are preferred since they are provided with a flexibility, a toughness and an elasticity in combination. Considering the environment, resins containing chlorine are preferably not used.

A coating amount of the adhesive layer 8 falls in a range of preferably 2 to 25 $g/m^2$. If it is 2 $g/m^2$ or more, a sufficiently high adhesive property of the base material 2 with the transparent resin layer 4 is obtained, and if it is 25 $g/m^2$ or less, it is preferred from an economical viewpoint. From the above viewpoints, a coating amount of the above ink falls usually, though depending on the kind of the base material 4, in a range of more preferably 3 to 20 $g/m^2$.

Also, a thickness of the adhesive layer 8 falls in a range of usually 2 to 25 µm, preferably 3 to 20 µm.

<Primer Layer 5>

In the sheet 1β of the present invention, a primer layer 5 is laminated preferably on the transparent resin layer 4.

A resin suitably selected from the binder resins used for the ink composition forming the colored resin layer 9 described above is preferably used for the primer layer 5. That is, polycarbonate base urethane (meth)acrylate, polyester base urethane (meth)acrylate or a resin comprising polycarbonate base urethane (meth)acrylate and (meth)acryl polyol is preferably used therefor. Use of the above resins makes it possible to provide the sheet 1β of the present invention with a very high weatherability.

The same weatherability-improving agent as used in the transparent resin layer 4 is preferably added to the primer layer 5 described above in order to enhance further the weatherability, and a UV absorber (UVA) and a light stabilizer (HALS) are preferably added. A content of the UV absorber is preferably 0.1 to 25 parts by mass, more preferably 1 to 25 parts by mass, further preferably 3 to 20 parts by mass and particularly preferably 5 to 20 parts by mass based on 100 parts by mass of the resin forming the primer layer 5. Also, a content of the light stabilizer is preferably 0.05 to 7 parts by mass, more preferably 0.5 to 5 parts by mass, further preferably 1 to 5 parts by mass and particularly preferably 2 to 5 parts by mass based on 100 parts by mass of the resin forming the primer layer 5.

A thickness of the primer layer 5 shall not specifically be restricted as long as it falls in a range in which the effects of the present invention are exerted, and it falls in a range of preferably 0.5 to 10 μm, more preferably 1 to 5 μm from the viewpoint of obtaining the sufficiently high weatherability.

The primer layer can be formed by publicly known printing methods, coating methods and the like using the resin composition described above as it is or in a state in which it is dissolved or dispersed in a solvent. Also, the primer layer may assume an embodiment in which it is provided with irregularities as shown in FIG. 2 or an embodiment in which it is even and provided with no irregularities. The embodiment in which the primer layer is provided with irregularities is preferred from the viewpoint of enhancing the designing property.

<Surface Protective Layer 6>

The sheet 1β of the present invention has a surface protective layer 6 on an outermost surface. The above surface protective layer 6 is the same as the surface protective layer of the foregoing sheet 1α in the present invention. Also, the surface protective layer 6 has preferably concave parts from the viewpoint of enhancing the designing property. A method for providing the surface protective layer 6 with the concave parts is also the same as in the surface protective layer of the sheet 1α in the present invention.

Figure 3:
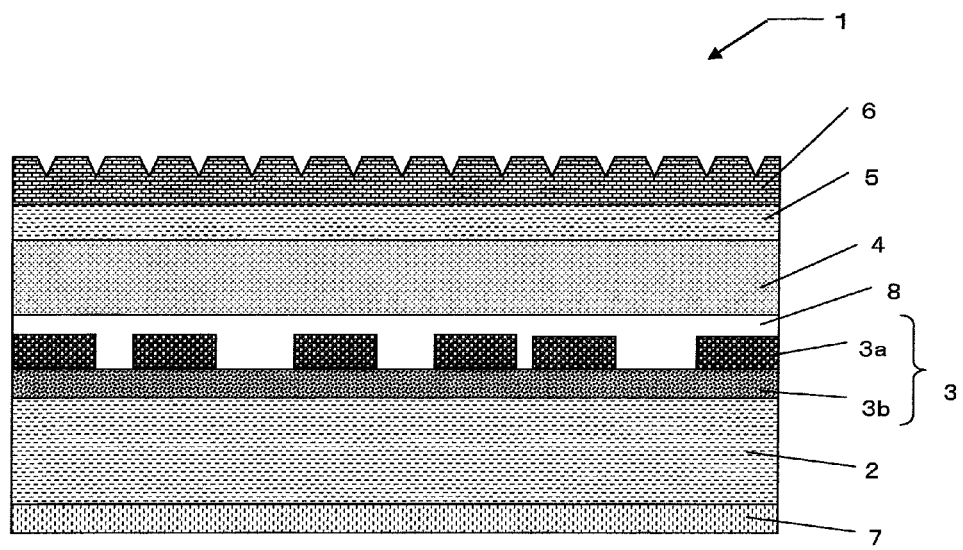
FIG. 3 is a schematic drawing showing a different embodiment of a cross section of the sheet in the present invention.

The primer layer 6 may assume an embodiment in which it is provided with irregularities as shown in FIG. 2 or an embodiment in which it is even and provided with no irregularities. The embodiment in which the primer layer is provided with irregularities is preferred from the viewpoint of enhancing the designing property. Also, concave parts may be provided, as shown in FIG. 3, on a surface protective layer which is even and provided with no irregularities. In the above case, the same method as that used in providing the concave parts on the transparent resin layer 4 can be used as a method for forming the above concave parts.

<<Decorated Sheet>>

The sheet 1 of the present invention can be used as a decorated sheet by laminating on an adherend so that the surface protective layer of the above sheet 1 is an outermost surface. Any of the sheet 1 and the sheet each described above can be employed for the decorated sheet, and the sheet is preferably laminated from the viewpoint of a designing property.

<Adherend>

The adherend shall not specifically be restricted, and the same ones as those used for publicly known decorated sheets can be used. They include, for example, woody materials, metals, ceramics, plastics, glasses and the like. In particular, the sheet 1 of the present invention can suitably be used for metal materials such as steel plates and the like and woody materials. The steel plates include, to be specific, hot dip galvanized sheet iron and the like, and the woody materials include, to be specific, wood veneers, lumber single panels, lumber plywoods, particle boards, middle density fiberboards (MDF) and the like which are produced from various materials such as Japanese cedar, cypress, zelkova tree, pine tree, lauan, teak, melapi and the like.

A method for laminating the sheet 1 of the present invention on various adherends shall not specifically be restricted, and a method in which the sheet 1 is adhered on an adherend by an adhesive can be employed. The adhesive can suitably be selected from publicly known adhesives according to the kind of the adherends. It includes, for example, polyvinyl acetate, polyvinyl chloride, polyvinyl chloride/polyvinyl acetate copolymers, ethylene/acrylic acid copolymers, ionomers and the like, and in addition thereto, it includes butadiene/acrylonitrile rubbers, neoprene rubbers natural rubbers and the like.

In adhering the sheet 1 of the present invention on various adherend by an adhesive, a rear face primer layer 7 is preferably provided since the adhesive property can be enhanced.

The decorated sheet thus produced can preferably be used, for example, as interior materials such as walls, ceilings, floors and the like, surface decorative sheets of fittings such as window frames, doors, handrails and the like, surface decorative sheets for cabinets of furnitures or light electric and OA appliances and exterior materials for front doors and the like. In particular, the decorated sheet prepared by using the sheet 1 of the present invention is excellent in a weatherability and has a high processing aptitude, and therefore it is stuck on a steel plate and suitably used as an exterior material for an entrance and the like.

Sheet 2:

A second embodiment of the sheet of the present invention (hereinafter referred to merely as the "sheet 2") has a surface protective layer which is obtained by cross-linking and curing the coating composition 2, and it shall not specifically be restricted as long as it has the above surface protective layer. The preferred embodiment of the sheet 2 of the present invention is the embodiments shown in FIGS. 1 and 2, that is, the same embodiments as those of the sheet 1α and the sheet 1β.

Also, the sheet 2 of the present invention can be laminated on an adherend to prepare a decorated sheet. A constitution of the above decorated sheet is the same as that of the decorated sheet explained in the first embodiment of the sheet of the present invention.

Figure 4:
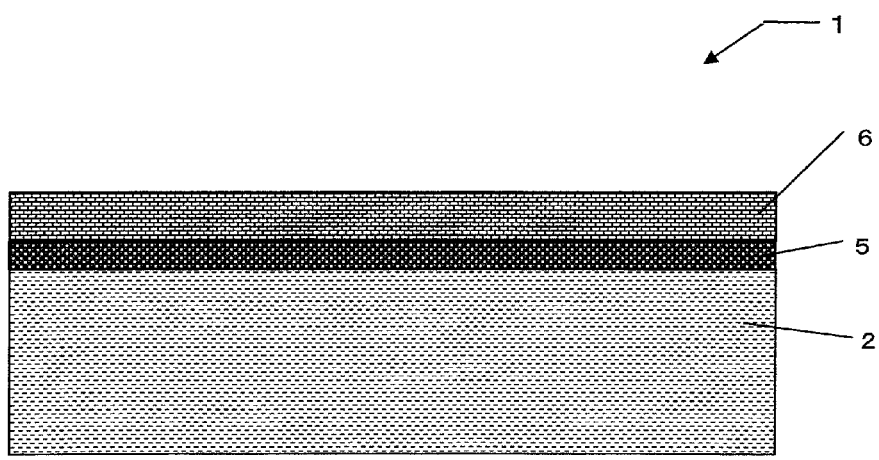
FIG. 4 is a schematic drawing showing a cross section of the coating film in the present invention.

Sheet 3:

A third embodiment of the sheet of the present invention (hereinafter referred to merely as the "sheet 3") has a surface protective layer which is obtained by cross-linking and curing the coating composition 3, and it shall not specifically be restricted as long as it has the above surface protective layer. FIG. 4 is a schematic drawing showing a cross section of the preferred embodiment of the sheet 3 in the present invention. In the embodiment shown in FIG. 4, a primer layer 4 and a surface protective layer 6 are laminated in order on one face of a base material 2.

<<Base Material>>

Materials used as the base material 2 in the sheet 3 of the present invention are preferably plastic films and plastic sheets, and they include preferably materials comprising polyolefin resins, vinyl base resins, polyester resins, acryl resins, polyamide resins, cellulose base resins, polystyrene resins, polycarbonate resins, polyallylate resins, polyimide resins and the like. Considering a visible light transmission property and a workability, among them, preferred are base material films of polyolefin resins such as polyethylene, polypropylene, polybutene, polymethylpentene, ethylene/propylene copolymers, ethylene/propylene/butene copolymers, polyolefin base thermoplastic elastomers and the like, and polyethylene and polypropylene are more preferred.

<UV Absorber>

The base material 2 used in the sheet 3 of the present invention contains preferably a UV absorber for the purpose of enhancing a weatherability. The UV absorber shall not specifically be restricted and includes preferably, for example, UV absorbers of a triazine base, a benzotriazole base, a benzophenone base, a benzoate base, a benzoic acid base, a salicylic acid base, a malonic acid base, an oxanilide base, oxalamide base and the like.

A content of the UV absorber contained in the base material 2 is preferably 0.1 to 10 parts by mass, more preferably 0.5 to 3 parts by mass based on 100 parts by mass of the resin used for the base material 2. If a content of the UV absorber falls in the ranges described above, the sheet 3 of the present invention can be efficiently provided with an excellent weatherability.

<Antistatic Agent>

The base material 2 contains preferably an antistatic agent from the viewpoint of providing the sheet 3 of the present with a self-cleaning performance and a visible light transmission property. The antistatic agent includes preferably high polymer type antistatic agents having a polyether structure such as polyether/polyolefin copolymers, polyetherester, polyetheresteramide, polyetheramide, polyetheramideimide and the like. They can be used alone or in combination of plural kinds thereof. Among them, the polyether/polyolefin copolymers and the polyetheresteramide are more preferred.

In this regard, the polyether/polyolefin copolymers include block copolymers in which a polyether part formed by polyethylene glycol and polypropylene glycol and a polyolefin part formed by polyethylene and polypropylene are combined alternately and in addition thereto, random copolymers and graft copolymers, and they are preferably the block copolymers from the viewpoint of providing a self-cleaning property. Commercially available products can be used as well for the above antistatic agents. The antistatic agents of the polyether/polyolefin copolymer include, for example, commercially available products such as "Pelestat 300", "Pelestat 230", "Pelestat 303" and the like, and the antistatic agents of the polyetheresteramide include commercially available products such as "Pelestat 6321" and the like.

A content of the antistatic agent contained in the base material 2 is 5 to 30 parts by mass, preferably 10 to 20 parts by mass based on 100 parts by mass of the resin used for the base material 2. If a content of the antistatic agent falls in the ranges described above, the sheet 3 of the present invention can be efficiently provided with an excellent weatherability and an excellent visible light transmission property.

The base material 2 can be subjected, if desired, on one face or both faces to physical or chemical treatment including an oxidation method such as corona discharge treatment, chromium oxidation treatment, hot blast treatment, an ozone•UV ray treating method and the like and a roughening method such as a sand blast method, a solvent treating method and the like.

A thickness of the base material film shall not specifically be restricted, and securing an excellent weatherability and considering a workability and a general versatility, it falls in a range of usually 20 to 200 µm, preferably 30 to 150 µm.

In the sheet 3 of the present invention, the base material 2 is prepared by turning the mixture obtained by mixing the resin, the UV absorber, the antistatic agent and the like each described above into film by, for example, a calendar method, an inflation method, a T die extrusion method and the like and more preferably biaxially stretching the film <<Primer Layer>>

The base material 2 is subjected preferably to such treatment as forming a primer layer 4 for strengthening an interlayer adhesive property between the above base material 2 and a surface protective layer 6. A material used for forming the primer layer 4 shall not specifically be restricted and includes acryl base resins, vinyl chloride/vinyl acetate copolymers, polyesters, polyurethanes, urethane acryl base resins, chlorinated polypropylene, chlorinated polyethylene and the like.

Further, the material used for forming the primer layer 4 includes preferably polycarbonate base urethane/acryl copolymers, polyester base urethane/acryl copolymers or resins comprising polycarbonate base urethane acryl and acryl or acryl polyol.

In this regard, the polycarbonate base urethane/acryl copolymer is a resin obtained by radically polymerizing an acryl monomer with a polycarbonate base polyurethane polymer obtained by reacting polycarbonatediol with diisocyanate using a radical polymerization initiator. Also, the polyester base urethane/acryl copolymer is a resin obtained by radically polymerizing an acryl monomer with a polyester base polyurethane polymer obtained by reacting polyesterdiol with diisocyanate using a radical polymerization initiator.

A UV absorber and a light stabilizer which are used for the primer layer can be added as well to the primer layer 4, and therefore it can be provided with an excellent weatherability by the sheet 3 of the present invention. A content of the UV absorber is preferably 5 to 40 parts by mass, more preferably 5 to 30 parts by mass and further preferably 5 to 25 parts by mass based on 100 parts by mass of the resin used for forming the primer layer 4. Also, a content of the light stabilizer is preferably 5 to 40 parts by mass, more preferably 5 to 30 parts by mass and further preferably 5 to 20 parts by mass based on 100 parts by mass of the resin used for forming the primer layer 4.

Further, painting for adjusting the color and patterns from the viewpoint of the design may be formed in advance as long as the visible light transmission property is not inhibited.

<<Surface Protective Layer>>

The surface protective layer 6 is a layer obtained by cross-linking and curing the coating composition 3 of the present invention described above. A thickness of the surface protective layer 6 is preferably 3 to 20 µm, more preferably 3 to 15 µm and further preferably 5 to 12 µm. If a thickness of the surface protective layer 6 falls in the ranges described above, the excellent self-cleaning performance, the excellent visible light transmission property and the excellent light fastness can efficiently be obtained. Further, the excellent workability is obtained as well.

<<Rear Face Coating Layer>>

The sheet 3 of the present invention can be provided with a rear face coating layer (not illustrated) on a surface opposite to a surface of the base material 2 on which the surface protective layer 6 described above is provide. The rear face coating layer can be endowed with performances according to the applications of the sheet 3 of the present invention. The same layer as the surface protective layer 6 described above can be provide, and a layer having different performances from those of the above surface protective layer 6 can be provided as well.

When the sheet 3 of the present invention is used for an agricultural film, the rear face coating layer is preferably a layer containing a drip-proof agent.

<Drip-Proof Agent>

Drip-proof agents which are usually used can be used for a drip-proof agent used for the sheet 3 of the present invention without limits. It includes preferably, for example, surfactants such as nonionic surfactants, anionic surfactants, cationic surfactants, amphoteric surfactants and the like and in addition thereto, particles of inorganic compounds such as silica, alumina, titanium oxide and the like, and the drip-proof agents of the inorganic compounds are preferably used from the viewpoint of a drip-proof property, especially a persistence of a drip-proof property.

In the sheet 3 of the present invention, among the inorganic compounds described above, silica particles are preferred, and silica particles having an average primary particle diameter of 1 to 300 nm, preferably 1 to 200 nm and more preferably 1 to 50 nm are preferred. A persistence of the particularly excellent droplet flow property is obtained by using the silica particles having the average primary particle diameters described above.

Any of polyhydric alcohol type surfactants and polyethylene glycol type surfactants can be used as the nonionic surfactants. To be specific, the polyhydric alcohol type surfactants include stearic acid sorbitan esters and oleic acid sorbitan esters of sorbitan mono-fatty acid esters, and the polyethylene glycol type surfactants include polyoxyethylene oleic acid esters, polyoxyethylene oleic acid diesters, polyoxyethylene stearic acid esters and the like.

The anionic surfactants include polyoxyethylene lauryl ether sodium sulfate of sulfuric ester salts, sodium alkylnaphthalenesulfonate of sulfonic acid salts, potassium alkylphosphate of phosphoric ester salts and the like, and the cationic surfactants include primary to tertiary amine salts, quaternary ammonium salts and the like. The amphoteric surfactants include amino acid type amphoteric surfactants, betaine type amphoteric surfactants and the like.

Also, surfactants having a reactivity can preferably be used as well for the surfactants. The surfactants having a reactivity include surfactants having functional groups having ethylenically double bonds such as a (meth)acryloyl group, a vinyl group, an aryl group and the like.

The rear face coating layer is formed by a coating composition for a rear face containing the drip-proof agent and a binder resin described later which form the above rear face coating layer, and a content of the drip-proof agent in the rear face coating layer is preferably 5/95 to 60/40, more preferably 5/95 to 55/45 and further preferably 5/95 to 30/70 in terms of a blend mass ratio of the binder resin to the drip-proof agent. If a content of the drip-proof agent falls in the ranges described above, an effect of the excellent drip-proof property is efficiently obtained, and whitening is not brought about on the rear face coating layer. Further, the plural sheets are readily connected by heat fusion, that is, the processability is enhanced.

<Binder Resin>

The rear face coating layer is formed usually by coating the coating composition for a rear face containing the drip-proof agent and the binder resin and curing it. The binder resin can suitably be selected from publicly known binders such as thermoplastic resins, thermosetting resins and the like, and it includes preferably, for example, single substances or mixtures comprising cellulose base resins such as nitrocellulose, cellulose acetate, cellulose acetate propionate and the like; acryl resins such as polymethyl (meth)acrylate, polybutyl (meth)acrylate, methyl (meth)acrylate/butyl(meth)acrylate/ 2-hydroxyethyl (meth)acrylate copolymers and the like; and in addition thereto, urethane resins, vinyl chloride/vinyl acetate copolymers, polyester resins, alkyd resins and the like. The above resins can be used alone or in a mixture of two or more kinds thereof.

The binder resin includes preferably ionizing radiation-curable resins. If the ionizing radiation-curable resin is used, the excellent drip-proof property is obtained, and particularly a persistence thereof is excellent. Further, the excellent processability is obtained as well. The ionizing radiation-curable resin used for the rear face coating layer includes preferably the polymerizable oligomers described as the ionizing radiation-curable resin which can be used for forming the surface protective layer described above, that is, the oligomers having a radically polymerizable unsaturated group in a molecule such as the oligomers of an epoxy (meth)acrylate base, a urethane (meth)acrylate base, polyether base urethane (meth) acrylate, a polyester (meth)acrylate base and a polyether (meth)acrylate base. Among them, the oligomers of the urethane (meth)acrylate base are preferred. The above urethane (meth)acrylate base oligomers can be obtained, for example, by esterifying polyurethane oligomers obtained by reacting polyetherpolyol and polyesterpolyol with polyisocyanate by (meth)acrylic acid.

The number of the functional groups in the urethane (meth) acrylate which is employed as the ionizing radiation-curable resin used for the rear face coating layer is preferably 2 to 16, more preferably 2 to 10 and further preferably 2 to 6. If the number of the functional groups falls in the ranges described above, the drip-proof property and particularly a persistence thereof are excellent, and the excellent processability is obtained as well.

<Various Additives>

A rear face coating composition forming the rear face coating layer can contain various additives as long as a drip-proof property which is a preferred important performance of the rear face coating layer is not inhibited. The various additives include, in addition to, for example, the UV absorber contained in the surface protective layer, a polymerization inhibitor, a cross-linking agent, an antistatic agent, an adhesion improving agent, an antioxidant, a leveling agent, a thixotropy-providing agent, a coupling agent, a plasticizer, a defoaming agent, a filler, a solvent and the like.

A thickness of the rear face coating layer is preferably 0.3 to 10 μm, more preferably 0.3 to 5 μm and further preferably 0.5 to 4 μm. If a thickness of the rear face coating layer falls in the ranges described above, the excellent drip-proof property is efficiently obtained, and the excellent processability is obtained as well.

<<Production Method for the Sheet 3>>

The sheet 3 of the present invention can more preferably be produced, for example, by the following method. The resin composition for forming the primer layer preferably provided is coated on one face of the base material 2, and then the coating composition 3 forming the surface protective layer 6 is coated thereon. In this respect, the resin composition for forming the primer layer and the coating composition 3 are coated by publicly known methods such as gravure coating, bar coating, roll coating, reverse roll coating, comma coating and the like, preferably gravure coating so that the respective thicknesses thereof after curing fall in the ranges described above.

An uncured resin layer formed by coating the coating composition 3 is cross-linked and cured by irradiating with an ionizing radiation such as an electron beam, a UV ray and the like, whereby it is turned into the surface protective layer 6. A method for cross-linking and curing the above uncured resin layer is the same as the method for cross-linking and curing in the surface protective layer of the sheet 1 in the first embodiment of the sheet of the present invention.

Also, when the rear face coating layer is provided, the coating composition for a rear face which forms the rear face coating layer is coated on a surface opposite to a surface of the base material 2 on which the surface protective layer 6 is provide before or after coating the ionizing radiation-curable resin composition used for forming the surface protective layer 6.

The uncured resin layer formed by coating the coating composition for a rear face in forming the rear face coating layer is different in a curing method depending on the binder resin used for the above coating composition, and when a thermosetting resin and a thermoplastic resin are employed, the uncured resin layer is cured by heat treatment to obtain the rear face coating layer. Also, when the ionizing radiation-curable resin is employed as the binder resin, the uncured resin layer is cured in the same manner as in the coating composition 3 used for forming the surface protective layer 6 to obtain the rear face coating layer. The order of forming the surface protective layer 6 shall not specifically be restricted, and the rear face coating layer can be formed usually after forming the surface protective layer 6 by cross-linking and curing.

The sheet 3 thus obtained is provided with an excellent self-cleaning property and an excellent weatherability and in addition thereto, a visible light transmission property, a UV ray-blocking performance, a weatherability-keeping property, a workability and a persistence thereof, and therefore it is suitably used for applications such as agricultural use for plastic houses and the like and protective sheets for plate glasses. Also, when the rear face coating layer is provided, the sheet has a drip-proof property, and therefore it is more suitably used for applications such as agricultural use for plastic houses and protective sheets for plate glasses.

When the sheet 3 of the present invention is used for agricultural use such as plastic houses and the like, it is provided preferably with the surface protective layer 6 turned to an outside (an outside of the plastic houses). It becomes possible to put effectively the characteristics of the surface protective layer 6 to efficient use, and the sheet is provided with an excellent performance as an agricultural film.

Sheet 4:

A fourth embodiment of the sheet of the present invention (hereinafter referred to merely as the "sheet 4") has a surface protective layer obtained by cross-liking and curing a coating composition 4, and it shall not specifically be restricted as long as it has the above surface protective layer. A specific layer constitution of the sheet 4 includes, for example:

(1) a constitution in which a surface protective layer is laminated on a base material,
(2) a constitution in which a primer layer and a surface protective layer are laminated in order on a base material,
(3) a constitution in which a pattern-printed layer, a primer layer and a surface protective layer are laminated in order on a base material,
(4) a constitution in which a transparent resin layer, a primer layer and a surface protective layer are laminated in order on a base material,
(5) a constitution in which a transparent adhesive layer, a transparent resin layer, a primer layer and a surface protective layer are laminated in order on a base material and
(6) a constitution in which a pattern-printed layer, a transparent adhesive layer, a transparent resin layer, a primer layer and a surface protective layer are laminated in order on a base material. The layer constitution of (6) described above shall be shown below and explained as an example for explanation of the specific layer constitution.

The base material and the pattern-printed layer (the picture layer and the colored layer) are the same as those of the sheet 1. Also, the surface protective layer is the same as that of the sheet 1, except that the coating composition 4 of the present invention is used.

<<Primer Layer>>

The primer layer can be formed by coating a publicly known primer agent on one face or both faces of the base material. The primer agent includes, for example, urethane resin base primer agents comprising acryl-modified urethane resins and the like, primer agents comprising urethane/cellulose base resins (for example, resins obtained by adding hexamethylenediisocyanate to a mixture of urethane and nitrocellulose) and the like.

A coating amount of the primer agent shall not specifically be restricted, and it is usually 0.1 to 20 $g/m^2$, preferably 0.5 to 10 $g/m^2$.

<<Transparent Adhesive Layer>>

The transparent adhesive layer is a layer provided on the pattern-printed layer. The transparent adhesive layer shall not specifically be restricted as long as it is a transparent layer, and it includes any of the clear and colorless, colored transparent and translucent layers. The transparent adhesive layer is formed in order to adhere the pattern-printed layer with the transparent resin layer.

The adhesive shall not specifically be restricted, and adhesives which are publicly known in the field of a decorated sheet can be used. The above adhesives include, for example, thermoplastic resins such as polyamide resins, acryl resins, vinyl acetate resins and the like and thermosetting resins such as thermosetting urethane resins and the like. Further, two-component curing type polyurethane resins or polyester resins using isocyanate as a curing agent can be applied as well.

The transparent adhesive layer can be formed, for example, by coating the adhesive on the pattern-printed layer (to be strict, on the base material so that the picture layer is covered), coating the coating agent constituting the transparent resin layer and then drying and curing it. The conditions of the drying temperature, the drying time and the like shall not specifically be restricted, and they can suitably be set according to the kind of the adhesives. A method for coating the adhesive shall not specifically be restricted, and capable of being employed are methods such as roll coating, curtain flow coating, wire bar coating, reverse coating, gravure coating, gravure reverse coating, air knife coating, kiss coating, blade coating, smooth coating, comma coating and the like.

A thickness of the transparent adhesive layer shall not specifically be restricted, and a thickness thereof after dried is 0.1 to 30 µm, preferably 1 to 20 µm.

<<Transparent Resin Layer>>

The transparent resin layer may be colored as long as it is transparent, and it may be translucent as long as the pattern-printed layer is visible.

The resin constituting the transparent resin layer includes, for example, polyvinyl chloride, polyethylene terephthalate, polybutylene terephthalate, polyamide, polyethylene, polypropylene, ethylene/vinyl acetate copolymers, ethylene/acrylic acid copolymers, ethylene/acrylic ester copolymers, ionomers, polymethylpentene, (meth)acrylic esters, polycarbonate, cellulose triacetate and the like. Among the resins described above, polyolefin base resins such as polypropylene and the like are preferred. Polyolefin base resins having a stereoregularity are more preferred. When the polyolefin base resin is used, the transparent resin layer is preferably formed from the molten polyolefin base resin by an extrusion method.

Various additives such as a filler, a delusterant, a foaming agent, a flame retardant, a lubricant, an antistatic agent, an antioxidant, a UV absorber, a light stabilizer, a radical scavenger, a soft component (for example, rubber) and the like may be contained, if necessary, in the transparent resin layer.

A thickness of the transparent resin layer shall not specifically be restricted, and it is set usually to 10 to 150 µm.

A face which is a surface of the transparent resin layer and on which the surface protective layer is formed may be subjected, if necessary, to surface treatment such as corona discharge treatment, ozone treatment, plasma treatment, ionizing radiation treatment, bichromic acid treatment and the like. The surface treatment can be carried out according to the conventional methods of the respective treatments.

<<Emboss Processing>>

After the coating composition 4 of the present invention is laminated as the surface protective layer (outermost surface layer) on the transparent resin layer described above, a front face of the surface protective layer may be subjected to emboss processing.

An emboss processing method therefor shall not specifically be restricted, and it can be carried out by a usual method using a publicly known embossing equipment of a single layer type or a rotary type. An irregularity form thereof includes, for example, wood grain conduit groove, stone slab surface irregularity (granite peeled face and the like), cloth surface texture, pearskin finish, sand grain, hair line, line screen groove and the like.

Alkyl silicate having a methoxy group is contained in the sheet 4 of the present invention, and therefore when the above sheet is brought into contact with water (rain water), a hydroxyl group is produced by hydrolysis of the alkyl silicate to provide the sheet with a hydrophilicity. In this regard, the alkyl silicate having a methoxy group is used in the present invention, and therefore the hydrophilicity is obtained more quickly than in a case in which other alkyl silicates (for example, alkyl silicates having ethyl and butyl) are used.

Development of the hydrophilicity allows a wetting property of water to be enhanced and a self-cleaning action of the sheet 4 to be exerted. That is, contaminants of the sheet 4 are liable to be removed by rain water and the like, and the contaminants are less liable to be deposited thereon. Further, a thin water film is liable to be formed on a whole part of the sheet 4 by rain water and the like, and a static charge is inhibited from being generated on a surface thereof, so that dirts and dusts in the air are less liable to be adsorbed thereon. Further, the sheet 4 of the present invention is used, and therefore the alkyl silicate is less liable to drop out due to a three-dimensional cross-linking structure thereof, so that the sheet is improved in a scratch resistance and liable to keep a hydrophilicity and an antifog property over a long period of time.

The coating composition 4 used for forming the sheet 4 of the present invention can be used in the form of a sheet without providing thereon the other layers described above by curing a coating film of the above coating composition 4. To be specific, the coating composition 4 can be used in the form of a sheet, for example, by forming a film-like coating film by a publicly known coating method such as gravure coating, roll coating and the like and then curing the coating film. The above coating film may be formed directly on a structure targeted for coating or may be formed by laminating on a peelable transfer sheet substrate. The coating film can be cured, for example, by irradiating with an ionizing radiation. A method of curing by irradiating with an ionizing radiation is the same method as, for example, a method of curing in forming the surface protective layer of the sheet 1.

A thickness of the sheet obtained by curing a coating film of the coating composition 4 shall not specifically be restricted and can suitably be set according to the characteristics of the finished product, and it is usually 0.1 to 50 µm, preferably 1 to 20 µm. The above sheet has the same performances as those of the surface protective layer formed by using the coating composition 4 described above.

Sheet 5:

A fifth embodiment of the sheet of the present invention (hereinafter referred to merely as the "sheet 5") has a surface protective layer obtained by cross-liking and curing a coating composition 5, and it shall not specifically be restricted as long as it has the above surface protective layer. A preferred embodiment of the sheet 5 is the same as the embodiment shown in FIG. 4, that is, that of the sheet 3 described above.

EXAMPLES

Next, the present invention shall be explained in further details with reference to examples, but the present invention shall by no means be restricted by these examples.

1. Coating Composition 1 and Sheet 1

Evaluation Methods:

(1-1) Evaluation of Weatherability (Weatherability Test):

The sheets obtained in the examples and the comparative examples were set in Metal Weather manufactured by DAIPLA WINTES Co., Ltd. and subjected to a weatherability test in which they were left standing on light conditions (illuminance: 60 mW/cm$^2$, black panel temperature: 63° C., humidity in the layer: 50% RH) for 20 hours, on dew condensation conditions (illuminance: 0 mW/cm$^2$, black panel temperature: 30° C., humidity in the layer: 98% RH) for 4 hours and on a water spraying condition (10 seconds before and after the dew condensation conditions) for 800 hours. After the above test, the sheets were held for 2 days on the conditions of 25° C. and 50% RH, and then an appearance of cracks and whitening on a surface of the sheet was evaluated according to the following criteria:

⊚: appearance change was not observed at all
○: appearance change was scarcely observed
Δ: appearance change was slightly observed, but problems were not involved practically
X: appearance change was notably observed (1-2) Evaluation of Weatherability Adhesive Property:

The sheet subjected to the weatherability test described above was subjected once to operation in which Cellotape (registered trade name) manufactured by Nichiban Co., Ltd. was stuck on a surface thereof and rapidly peeled off. Then, whether or not the respective layers provided on the base material were peeled off was confirmed by visual observation and evaluated according to the following criteria:

○: layers were not peeled off at all
Δ: layers were slightly peeled off, but problems were not involved practically
X: layers were notably peeled off (1-3) Evaluation of Stickiness (Bleed Out):

The sheets obtained in the examples and the comparative examples were stored for 24 hours on the condition of 80° C., and then a surface of the decorated sheet was touched with a finger and evaluated according to the following criteria:

○: stickiness was not observed at all

Δ: stickiness brought about by bleeding of the UV absorber and the like was slightly observed, but problems were not involved practically X: stickiness brought about by bleeding was notably observed (1-4) Evaluation of Solvent Resistance:

A gauze was set to a plummet of 300 g/cm² by a rubber band and impregnated with ethyl acetate. The plummet was reciprocated 50 times in a lateral direction on the surfaces of the sheets obtained in the respective examples and comparative examples, and the surfaces of the sheets were visually observed and evaluated according to the following criteria:

○: change on the surface of the sheet was not observed at all

Δ: change on the surface of the sheet was slightly observed, but problems were not involved practically X: change on the surface of the sheet was notably observed (1-5) Evaluation of Yellowing:

In the respective examples and comparative examples, a color on a surface of the sheet immediately after irradiated with an electron beam was evaluated according to the following criteria:

○: yellowing was not observed at all

Δ: yellowing was slightly observed, but problems were not involved practically

X: yellowing was notably observed (1-6) Evaluation of Scratch Resistance:

The sheets obtained in the respective examples and comparative examples were rubbed thereon in five reciprocations by using a steel wool on which a weight of 300 g/cm² was applied, and the appearances thereof were visually evaluated. They were evaluated according to the following criteria:

○: change was scarcely observed on the appearance

Δ: slight scratches and gloss change were observed on the appearance

X: scratches and gloss change were observed on the appearance (1-7) Evaluation of Transparency:

The states on the surfaces of the sheets obtained in the respective examples and comparative examples were evaluated according to the following criteria:

○: haze feeling (cloudy feeling) was not observed at all

Δ: haze feeling was slightly observed, but problems were not involved practically X: haze feeling was observed (1-8) Evaluation of Self-Cleaning Property (Initial Performance) and Persistence Thereof:

The sheets obtained in the examples and the comparative examples were set outdoors toward the south at a gradient of 45°. Then, an adhesion and deposition state of contaminants on the surface was evaluated according to the following criteria to set it to evaluation of the initial performance. Further, the sheets obtained in the examples and the comparative examples were subjected to an outdoor exposure test in which they were set outdoors toward the south at a gradient of 45° and then left standing for 3 months. Then, an adhesion and deposition state of contaminants on the surface was evaluated according to the following criteria to set it to evaluation of a persistence thereof:

⊚: adhesion and deposition of contaminants were not observed at all

○: adhesion and deposition of contaminants were scarcely observed

Δ: adhesion and deposition of contaminants were slightly observed, but problems were not involved practically X: adhesion and deposition of contaminants were notably observed

Example 1-1

A resin sheet comprising a transparent polypropylene resin (thickness: 80 μm) was prepared as the base material 2. A surface and a rear face thereof were subjected to corona discharge treatment, and then a composition for forming a primer layer having the following composition was coated (2.5 g/m²) on the above surface to form a primer layer (thickness: 2 μm). Next, an ionizing radiation-curable resin composition having the following composition was prepared to form a coating film by a gravure coating method, and the coating film described above was cross-linked and cured by irradiating with an electron beam on the conditions of 175 keV and 5 Mrad (50 kGy), whereby a surface protective layer (5 g/m²) was formed to obtain a sheet. A thickness of the surface protective layer was 5 μm.

The sheet thus obtained was evaluated for the items described above, and the evaluation results thereof are shown in Table 1.

Composition of Composition for Forming a Primer Layer:

It is a composition obtained by mixing a resin composition and a curing agent each shown below in a proportion of 100:5 (mass ratio).

Resin Composition:

| | |
|---|---|
| Polycarbonate base urethane acrylate (mass ratio of a urethane component and an acryl component in the polycarbonate base urethane acrylate: 70/30) | 100 parts by mass |
| Hydroxyphenyltriazine base UV absorber (Tinuvin 400 (trade name), manufactured by Ciba Specialty Chemicals K.K.) | 15 parts by mass |
| Hydroxyphenyltriazine base UV absorber (Tinuvin 479 (trade name), manufactured by Ciba Specialty Chemicals K.K.) | 5 parts by mass |
| Hindered amine base light stabilizer (Tinuvin 123 (trade name), manufactured by Ciba Specialty Chemicals K.K.) | 6 parts by mass |

Curing Agent:
Hexamethylenediisocyanate
Composition of Ionizing Radiation-Curable Resin Composition:

| | |
|---|---|
| Caprolactone base urethane acrylate oligomer (trifunctional, (weight average molecular weight: about 1200) | 100 parts by mass |
| Triazine base UV absorber (Tinuvin 479 (trade name), 2-(2-hydroxy-4-[1-octyloxycarbonylethoxy]phenyl)-4,6-bis(4-phenylphenyl)-1,3,5-triazine, manufactured by Ciba Specialty Chemicals K.K.) | 2 parts by mass |
| Light stabilizer having a reactive functional group (trade name: Sanol LS-3410, 1,2,2,6,6-pentamethyl-4-piperidinylmethacrylate, manufactured by Ciba Specialty Chemicals K.K.) | 6 parts by mass |

Example 1-2

A sheet was prepared in the same manner as in Example 1-1, except that in Example 1-1, a content of the triazine base UV absorber contained in the ionizing radiation-curable resin composition was changed to 6 parts by mass.

The sheet thus obtained was evaluated for the items described above, and the evaluation results thereof are shown in Table 1.

Example 1-3

A sheet was prepared in the same manner as in Example 1-1, except that in Example 1-1, 10 parts by mass of a silicate compound having a vinyl group at an end represented by the following Chemical Formula (4) was further added to the ionizing radiation-curable resin composition.

The sheet thus obtained was evaluated for the items described above, and the evaluation results thereof are shown in Table 1.

[Ka 4]

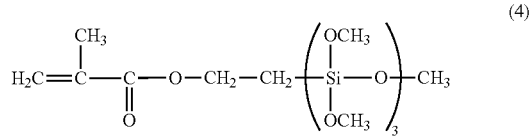

(4)

Example 1-4

A sheet was prepared in the same manner as in Example 1-1, except that in Example 1-1, a mixed resin of polycarbonate base urethane acrylate and acryl polyol (mass ratio of a urethane component and an acryl component in the polycarbonate base urethane acrylate: 70/30, a mass ratio of urethane acrylate and acryl polyol: 50/50) was used in place of the polycarbonate base urethane acrylate in the primer layer.

The sheet thus obtained was evaluated for the items described above, and the evaluation results thereof are shown in Table 1.

Example 1-5

A resin sheet comprising a colored polypropylene resin (thickness: 80 μm) was prepared as the base material 2. A surface and a rear face thereof were subjected to corona discharge treatment, and then a wood grain pattern was formed on a surface thereof by gravure printing to obtain a pattern-printed layer 3. On the other hand, a rear face primer layer 7 (thickness: 2 μm) comprising a urethane base resin as a binder was formed on a rear face thereof by gravure printing.

A transparent resin layer 4 (thickness: 80 μm) obtained by melting a polypropylene base thermoplastic resin by a T die was formed, and the transparent resin layer 4 was laminated thereon by a dry lamination method. A surface of the transparent resin layer 4 was heated by means of a heater of an infrared non-contact system to soften a surface of the transparent resin layer 4, and a surface of the transparent resin layer 4 at a side opposite to the base material 2 was subjected immediately to emboss processing by hot pressing to provide an irregular pattern of a wood grain conduit groove pattern.

Next, a surface of the transparent resin layer 4 was subjected to corona discharge treatment, and then it was subjected to wiping processing. An ink composition used for the wiping processing was prepared by adding 5 by mass of a colorant (containing carbon black, isoindolinone and quinacridone) and 15% by mass of silica particles (non-treated silica "commercially available product", average particle diameter: 3 μm) to the composition for forming a primer layer used in Example 1-1.

The above ink composition was coated on the transparent resin layer 4 described above, and a coated face thereof was subjected to wiping processing, whereby a colored resin layer 9 was formed in the concave parts of the transparent resin layer 4. A coating amount thereof was 1.5 g/m². Next, the ink composition used for forming the colored resin layer 9 described above was coated thereon to form a primer layer 5 (2.5 g/m²).

Next, a composition was prepared by adding to the ionizing radiation-curable resin composition used in Example 1-1, 10 parts by mass of silica (oil absorption: 200 to 300 ml/100 g, apparent specific gravity: 0.08 to 0.16 g/cm³) having an average particle diameter of 5 μm, 5 parts by mass of silica (oil absorption: 0 to 50 ml/100 g, apparent specific gravity: 0.45 to 0.85 g/cm³) having an average particle diameter of 4 μm and 5 parts by mass of wax (aliphatic wax, melting point: 110 to 200° C.) each based on 100 parts by mass of the caprolactone base urethane acrylate contained in the above composition, and it was used to form a coating film by gravure coating. Then, the coating film described above was cross-linked and cured by irradiating with an electron beam on the conditions of 175 keV and 5 Mrad (50 kGy), whereby a surface protective layer (5 g/m²) was formed to obtain a sheet. A thickness of the surface protective layer was 5 μm.

Example 1-6

A sheet was prepared in the same manner as in Example 1-1, except that in Example 1-1, acrylpolyol was used alone as the resin for forming the primer layer. The sheet thus obtained was evaluated for the items described above, and the evaluation results thereof are shown in Table 1.

Example 1-7

A sheet was prepared in the same manner as in Example 1-1, except that in Example 1-1, polyester base urethane acrylate was used as the resin for forming the primer layer. The sheet thus obtained was evaluated for the items described above, and the evaluation results thereof are shown in Table 1.

Example 1-8

A sheet was prepared in the same manner as in Example 1-3, except that in Example 1-3, the silicate compound was changed to alkyl silicate 1-1 (MS-56 (trade name), manufactured by Mitsubishi Chemical Corporation, an average decamer (mixture of a decamer to a dodecamer) of alkyl silicate in which all of $R^{12}$ to $R^{15}$ in Formula (3) described above are methyl, weight average molecular weight: 1100 to 1300). The sheet thus obtained was evaluated for the items described above, and the evaluation results thereof are shown in Table 1.

Example 1-9

A sheet was prepared in the same manner as in Example 1-3, except that in Example 1-3, the silicate compound was changed to alkyl silicate 1-2 (MS-56S (trade name), manufactured by Mitsubishi Chemical Corporation, an average hexadecamer (mixture of a tetradecamer to an octadodecamer) of alkyl silicate in which all of $R^{12}$ to $R^{15}$ in Formula (3) described above are methyl, weight average molecular weight: 1500 to 1900). The sheet thus obtained was evaluated for the items described above, and the evaluation results thereof are shown in Table 1.

Example 1-10

A sheet was prepared in the same manner as in Example 1-3, except that in Example 1-3, the silicate compound was changed to alkyl silicate 1-3 (Methyl Silicate 51 (trade name), manufactured by COLCOAT CO., Ltd., an average heptamer of alkyl silicate in which all of $R^{12}$ to $R^{15}$ in Formula (3) described above are methyl, weight average molecular weight: 789). The sheet thus obtained was evaluated for the items described above, and the evaluation results thereof are shown in Table 1.

Example 1-11

A sheet was prepared in the same manner as in Example 1-3, except that in Example 1-3, the silicate compound was changed to alkyl silicate 1-4 having methoxy and ethoxy (EMS-485 (trade name), manufactured by COLCOAT CO., Ltd., an average decamer of alkyl silicate in which $R^{12}$ and $R^{13}$ in Formula (3) described above are methyl and in which $R^{14}$ and $R^{15}$ are ethyl, molecular weight: 1300). The sheet thus obtained was evaluated for the items described above, and the evaluation results thereof are shown in Table 1.

Comparative Example 1-1

The same materials and production process as in Example 1-1 were used to prepare a sheet, except that in Example 1-1, a polyether base urethane acrylate oligomer (difunctional, molecular weight: about 3000) was used in place of the caprolactone base urethane acrylate contained in the ionizing radiation-curable resin composition, and the evaluation results thereof are shown in Table 2.

Comparative Example 1-2

A sheet was prepared in the same manner as in Example 1-1, except that in Example 1-1, 2% by mass of a benzotriazole base UV absorber (Tinuvin 384-2 (trade name), manufactured by Ciba Specialty Chemicals K.K.) was added in place of the triazine base UV absorber contained in the ionizing radiation-curable resin composition, and the evaluation results thereof are shown in Table 2.

Comparative Example 1-3

A sheet was prepared in the same manner as in Example 1-1, except that in Example 1-1, 6% by mass of a hindered amine base light stabilizer (Tinuvin 123 (trade name), manufactured by Ciba Specialty Chemicals K.K.) having no reactive functional group was added in place of the light stabilizer having a reactive functional group contained in the ionizing radiation-curable resin composition, and the evaluation results thereof are shown in Table 2.

Comparative Example 1-4

A sheet was prepared in the same manner as in Example 1-1, except that in Example 1-1, 6% by mass of the triazine base UV absorber contained in the ionizing radiation-curable resin composition was added and that 6% by mass of the hindered amine base light stabilizer (Tinuvin 123 (trade name), manufactured by Ciba Specialty Chemicals K.K.) having no reactive functional group was added in place of the light stabilizer having a reactive functional group contained in the ionizing radiation-curable resin composition. The evaluation results thereof are shown in Table 2.

Comparative Example 1-5

A sheet was prepared in the same manner as in Example 1-1, except that in Example 1-1, 6% by mass of a powdery hindered amine base light stabilizer (Tinuvin 144 (trade name), manufactured by Ciba Specialty Chemicals K.K.) was added in place of the light stabilizer having a reactive functional group contained in the ionizing radiation-curable resin composition. The evaluation results thereof are shown in Table 2.

TABLE 1

| | | | Example | | | | | | | | | | |
|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 | 1-11 |
| Base material | Transparent polypropylene resin | | ○ | ○ | ○ | ○ | — | ○ | ○ | ○ | ○ | ○ | ○ |
| | Colored polypropylene resin | | — | — | — | — | ○ | — | — | — | — | — | — |
| Primer layer | Resin | Polycarbonate base urethane acrylate | 100 | 100 | 100 | — | 100 | — | — | 100 | 100 | 100 | 100 |
| | | Mixed resin | — | — | — | 100 | — | — | — | — | — | — | — |
| | | Acrylpolyol | — | — | — | — | — | 100 | — | — | — | — | — |
| | | Polyester base urethane acrylate | — | — | — | — | — | — | 100 | — | — | — | — |
| | UV absorber | Hydroxyphenyl-triazine base | 20 | 20 | 20 | 20 | 20 | 20 | 20 | 20 | 20 | 20 | 20 |
| | Light stabilizer | Hindered amine base | 6 | 6 | 6 | 6 | 6 | 6 | 6 | 6 | 6 | 6 | 6 |
| Coating agent | Resin | Caprolactone base | 100 | 100 | 100 | 100 | 100 | 100 | 100 | 100 | 100 | 100 | 100 |
| | | Polyether base | — | — | — | — | — | — | — | — | — | — | — |
| | UV absorber | Triazine base | 2 | 6 | 2 | 2 | 2 | 2 | 2 | 2 | 2 | 2 | 2 |
| | | Benzotriazole base | — | — | — | — | — | — | — | — | — | — | — |
| | Light stabilizer | Reactive functional group present | 6 | 6 | 6 | 6 | 6 | 6 | 6 | 6 | 6 | 6 | 6 |
| | | No reactive functional group (liquid) | — | — | — | — | — | — | — | — | — | — | — |

TABLE 1-continued

|  |  | Example | | | | | | | | | | |
|---|---|---|---|---|---|---|---|---|---|---|---|---|
|  |  | 1-1 | 1-2 | 1-3 | 1-4 | 1-5 | 1-6 | 1-7 | 1-8 | 1-9 | 1-10 | 1-11 |
|  | No reactive functional group (powder) | — | — | — | — | — | — | — | — | — | — | — |
|  | Silicate compound having reactive functional group | — | — | 10 | — | — | — | — | — | — | — | — |
|  | Alkyl silicate 1-1 | — | — | — | — | — | — | — | 10 | — | — | — |
|  | Alkyl silicate 1-2 | — | — | — | — | — | — | — | — | 10 | — | — |
|  | Alkyl silicate 1-3 | — | — | — | — | — | — | — | — | — | 10 | — |
|  | Alkyl silicate 1-4 | — | — | — | — | — | — | — | — | — | — | 10 |
| Evaluation | Weatherability | ◎ | ◎ | ◎ | ○~◎ | ◎ | ○ | △ | ○ | ○ | ○ | ○ |
|  | Weatherability adhesive property | ◎ | ◎ | ◎ | ○~◎ | ◎ | ○ | ○ | ○ | ○ | ○ | ○ |
|  | Stickiness | ○ | ○ | ○ | ○ | ○ | ○ | ○ | ○ | ○ | ○ | ○ |
|  | Solvent resistance | ○ | ○ | ○ | ○ | ○ | ○ | ○ | ○ | ○ | △ | ○ |
|  | Yellowing | ○ | ○ | ○ | ○ | ○ | ○ | ○ | ○ | ○ | ○ | ○ |
|  | Scratch resistance | ○ | ○ | ○ | ○ | ○ | ○ | ○ | ○ | ○ | ○ | ○ |
|  | Transparency | ○ | ○ | ○ | ○ | — | ○ | ○ | ○ | ○ | ○ | ○ |
|  | Self-cleaning property (initial) | — | — | ○ | — | — | — | — | ◎ | ◎ | ○ | ○ |
|  | Persistence of self-cleaning property | — | — | ◎ | — | — | — | — | ○ | ○ | ○ | ○ |

Remark: all the values of the primer layer and the coating agents in the table show parts by mass.

TABLE 2

|  |  |  | Comparative Example | | | | |
|---|---|---|---|---|---|---|---|
|  |  |  | 1-1 | 1-2 | 1-3 | 1-4 | 1-5 |
| Base material | Transparent polypropylene resin | | ○ | ○ | ○ | ○ | ○ |
|  | Colored polypropylene resin | | — | — | — | — | — |
| Primer layer | Resin | Polycarbonate base urethane acrylate | 100 | 100 | 100 | 100 | 100 |
|  |  | Mixed resin | — | — | — | — | — |
|  |  | Acrylpolyol | — | — | — | — | — |
|  |  | Polyester base urethane acrylate | — | — | — | — | — |
|  | UV absorber | Hydroxyphenyl-triazine base | 20 | 20 | 20 | 20 | 20 |
|  | Light stabilizer | Hindered amine base | 6 | 6 | 6 | 6 | 6 |
| Coating agent | Resin | Caprolactone base | — | 100 | 100 | 100 | 100 |
|  |  | Polyether base | 100 | — | — | — | — |
|  | UV absorber | Triazine base | 2 | — | 2 | 6 | 2 |
|  |  | Benzotriazole base | — | 2 | — | — | — |
|  | Light stabilizer | Reactive functional group present | 6 | 6 | — | — | — |
|  |  | No reactive functional group (liquid) | — | — | 6 | 6 | — |
|  |  | No reactive functional group (powder) | — | — | — | — | 6 |
|  | Silicate compound having reactive functional group | | — | — | — | — | — |
|  | Alkyl silicate 1-1 | | — | — | — | — | — |
|  | Alkyl silicate 1-2 | | — | — | — | — | — |
|  | Alkyl silicate 1-3 | | — | — | — | — | — |
|  | Alkyl silicate 1-4 | | — | — | — | — | — |
| Evaluation | Weatherability | | △ | ○ | X | ○ | X |
|  | Weatherability adhesive property | | X | ○ | △ | ○ | △ |
|  | Stickiness | | ○ | ○ | △ | X | ○ |
|  | Solvent resistance | | ○ | ○ | △ | X | △ |
|  | Yellowing | | ○ | X | ○ | ○ | ○ |
|  | Scratch resistance | | ○ | ○ | ○ | ○ | ○ |

TABLE 2-continued

|  | Comparative Example | | | | |
|---|---|---|---|---|---|
|  | 1-1 | 1-2 | 1-3 | 1-4 | 1-5 |
| Transparency | ○ | ○ | ○ | ○ | Δ |
| Self-cleaning property (initial) | — | — | — | — | — |
| Persistence of self-cleaning property | — | — | — | — | — |

Remark: all the values of the primer layer and the coating agents in the table show parts by mass.

2. Coating Composition 2 and Sheet 2
Evaluation Methods:
(2-1) Evaluation of Self-Cleaning Property:
The sheets obtained in the examples and the comparative examples were subjected to an outdoor exposure test in which they were set outdoors toward the south at a gradient of 45° and left standing for 3 months. Then, an adhesion and deposition state of contaminants on the surface was evaluated according to the following criteria:
○: adhesion and deposition of contaminants were scarcely observed
Δ: adhesion and deposition of contaminants were slightly observed, but problems were not involved practically
X: adhesion and deposition of contaminants were notably observed
(2-2) Evaluation of Persistence of Self-Cleaning Property:
The sheets obtained in the examples and the comparative examples were coated with a salad oil colored by a red dye and then washed with water. Thereafter, an adhesion and deposition state of contaminants on the surface was evaluated according to the following criteria:
⊚: change was not observed at all
○: adhesion and deposition of contaminants were scarcely observed
Δ: adhesion and deposition of contaminants were slightly observed, but problems were not involved practically
X: adhesion and deposition of contaminants were notably observed
(2-3) Warm Water Whitening Resistance:
The sheets obtained in the examples and the comparative examples were dipped in warm water of 50° C. and kept for 2 days, and then a whitening state on the sheet surface was evaluated according to the following criteria:
○: appearance change was not observed at all
Δ: appearance change was slightly observed, but problems were not involved practically
X: appearance change was notably observed
(2-4) Measurement of Surface Resistance:
The surface resistances of the sheets obtained in the examples and the comparative examples were measured by means of a digital insulation meter (manufactured by TOA-DKK CORPORATION).
(2-5) Charge Decay Rate Half-Time:
The charge decay rate half-times of the sheets obtained in the examples and the comparative examples were measured by means of an honest meter (manufactured by Shindo Electrostatic Co., Ltd.).
(2-6) Evaluation of Weatherability (Weatherability Test):
The sheets obtained in the examples and the comparative examples were set in Metal Weather manufactured by DAIPLA WINTES Co., Ltd. and subjected to a weatherability test in which they were left standing on light conditions (illuminance: 60 mW/cm$^2$, black panel temperature: 63° C., humidity in the layer: 50% RH) for 20 hours, on dew condensation conditions (illuminance: 0 mW/cm$^2$, black panel temperature: 30° C., humidity in the layer: 98% RH) for 4 hours and on a water spraying condition (10 seconds before and after the dew condensation conditions) for 800 hours. After the above test, the sheets were held for 2 days on the conditions of 25° C. and 50% RH, and then an appearance change of cracks and whitening on a surface of the sheet was evaluated according to the following criteria:
⊚: appearance change was not observed at all
○: appearance change was scarcely observed
Δ: appearance change was slightly observed, but problems were not involved practically
X: appearance change was notably observed
(2-7) Evaluation of Weatherability Adhesive Property:
The sheet subjected to the weatherability test described above was subjected once to operation in which Cellotape (registered trade name) manufactured by Nichiban Co., Ltd. was stuck on a surface thereof and rapidly peeled off. Then, whether or not the respective layers provided on the base material were peeled off was confirmed by visual observation and evaluated according to the following criteria:
○: layers were not peeled off at all
Δ: layers were slightly peeled off, but problems were not involved practically
X: layers were notably peeled off
(2-8) Evaluation of Stickiness (Bleed Out):
The sheets obtained in the examples and the comparative examples were stored for 24 hours on the condition of 80° C., and then a surface of the decorated sheet was touched with a finger and evaluated according to the following criteria:
○: stickiness was not observed at all
Δ: stickiness brought about by bleeding of the UV absorber and the like was slightly observed, but problems were not involved practically
X: stickiness brought about by bleeding was notably observed
(2-9) Evaluation of Solvent Resistance:
A gauze was set to a plummet of 300 g/cm$^2$ by a rubber band and impregnated with ethyl acetate. The plummet was reciprocated 50 times in a lateral direction on the surfaces of the sheets obtained in the respective examples and comparative examples, and the surfaces of the sheets were visually observed and evaluated according to the following criteria:
○: change on the surface of the sheet was not observed at all
Δ: change on the surface of the sheet was slightly observed, but problems were not involved practically
X: change on the surface of the sheet was notably observed
(2-10) Evaluation of Yellowing:
In the respective examples and comparative examples, a color on a surface of the sheet immediately after irradiated with an electron beam was evaluated according to the following criteria:

◯: yellowing was not observed at all

Δ: yellowing was slightly observed, but problems were not involved practically

X: yellowing was notably observed (2-11) Evaluation of Scratch Resistance:

The sheets obtained in the respective examples and comparative examples were rubbed thereon in five reciprocations by using a steel wool on which a weight of 300 g/cm² was applied, and the surfaces thereof were visually evaluated. They were evaluated according to the following criteria:

◯: change was scarcely observed on the appearance

Δ: slight scratches and gloss change were observed on the appearance

X: scratches were observed on the appearance, and gloss change was observed (2-12) Evaluation of Transparency:

The states on the surfaces of the sheets obtained in the respective examples and comparative examples were evaluated according to the following criteria:

◯: haze feeling (cloudy feeling) was not observed at all

Δ: haze feeling was slightly observed, but problems were not involved practically X: haze feeling was observed Example 2-1

A resin sheet comprising a transparent polypropylene resin (thickness: 80 μm) was prepared as the base material 2. A surface and a rear face thereof were subjected to corona discharge treatment, and then a composition for forming a primer layer having the following composition was coated (2.5 g/m²) on the above surface to form a primer layer (thickness: 2 μm). Next, an ionizing radiation-curable resin composition containing a silicate compound having a reactive functional group which had the following composition was prepared to form a coating film by a gravure coating method, and the coating film described above was cross-linked and cured by irradiating with an electron beam on the conditions of 175 keV and 5 Mrad (50 kGy), whereby a surface protective layer (5 g/m²) was formed to obtain a sheet. A thickness of the surface protective layer was 5 μm.

The sheet thus obtained was evaluated for the items described above, and the evaluation results thereof are shown in Table 3.

Composition of Composition for Forming a Primer Layer:

It is a composition obtained by mixing a resin composition and a curing agent each shown below in a proportion of 100:5 (mass ratio).

Resin Composition:

| | |
|---|---|
| Polycarbonate base urethane acrylate and acrylpolyol (mass ratio of a urethane component and an acryl component in the polycarbonate base urethane acrylate: 70/30, a mass ratio of urethane acrylate and acrylpolyol: 50/50) | 100 parts by mass |
| Hydroxyphenyltriazine base UV absorber (Tinuvin 400 (trade name), manufactured by Ciba Specialty Chemicals K.K.) | 15 parts by mass |
| Hydroxyphenyltriazine base UV absorber (Tinuvin 479 (trade name), manufactured by Ciba Specialty Chemicals K.K.) | 4 parts by mass |
| Hindered amine base light stabilizer (Tinuvin 123 (trade name), manufactured by Ciba Specialty Chemicals K.K.) | 3 parts by mass |

Curing Agent:
Hexamethylenediisocyanate

Composition of Ionizing Radiation-Curable Resin Composition:

| | |
|---|---|
| Polyether base urethane acrylate oligomer (trifunctional, molecular weight: 2000) | 100 parts by mass |
| Silicate compound represented by Chemical Formula (4) described above which has a vinyl group at an end | 10 parts by mass |
| Triazine base UV absorber (Tinuvin 479 (trade name), 2-(2-hydroxy-4-[1-octyloxycarbonylethoxy]phenyl)-4, 6-bis(4-phenylphenyl)-1,3,5-triazine, manufactured by Ciba Specialty Chemicals K.K.) | 2 parts by mass |
| Light stabilizer having a reactive functional group (trade name: Sanol LS-3410, 1,2,2,6,6-pentamethyl-4-piperidinylmethacrylate, manufactured by Ciba Specialty Chemicals K.K.) | 6 parts by mass |

Example 2-2

A sheet was prepared in the same manner as in Example 2-1, except that in Example 2-1, the ionizing radiation-curable resin composition was changed to caprolactone base urethane acrylate (trifunctional, weight average molecular weight: about 1200) and that the addition amounts of the UV absorber and the light stabilizer were changed to 2 parts by mass and 6 parts by mass respectively.

The sheet thus obtained was evaluated for the items described above, and the evaluation results thereof are shown in Table 3.

Example 2-3

A sheet was prepared in the same manner as in Example 2-2, except that in Example 2-2, the base material was changed to a transparent polypropylene resin (thickness: 80 μm, an antistatic agent content: 12.5% by mass) containing a high polymer type antistatic agent (Pelestat 300 (trade name), polyether/polyolefin block copolymer, manufactured by Sanyo Chemical Industries, Ltd.).

The sheet thus obtained was evaluated for the items described above, and the evaluation results thereof are shown in Table 3.

Example 2-4

A resin sheet comprising a colored polypropylene resin (thickness: 80 μm) was prepared as the base material 2. A surface and a rear face thereof were subjected to corona discharge treatment, and then a wood grain pattern was formed on a surface thereof by gravure printing to obtain a pattern-printed layer 3. On the other hand, a rear face primer layer 7 (thickness: 2 μm) comprising a urethane base resin as a binder was formed on a rear face thereof by gravure printing.

Then, a transparent resin layer 4 (thickness: 80 μm) obtained by melting a polypropylene base thermoplastic resin by a T die was formed, and the transparent resin layer 4 was laminated by a dry lamination method on an adhesive layer 8 (thickness in a dry state: 15 μm) prepared by coating a coating liquid comprising a two-component curing type urethane resin.

Next, a surface of the transparent resin layer 4 was heated by means of a heater of an infrared non-contact system to soften a surface of the transparent resin layer 4. Then, a surface of the transparent resin layer 4 at a side opposite to the base material 2 was subjected immediately to emboss processing by hot pressing to provide an irregular pattern of a wood grain conduit groove pattern.

Next, a surface of the transparent resin layer 4 was subjected to corona discharge treatment, and then it was subjected to wiping processing. An ink composition used for the wiping processing was prepared by adding 5% by mass of a colorant (containing carbon black, isoindolinone and quinacridone) and 15% by mass of silica particles (non-treated silica "commercially available product", average particle diameter: 3 μm) to the composition for forming a primer layer used in Example 1-1.

The above ink composition was coated on the transparent resin layer 4 described above, and a coated face thereof was subjected to wiping processing, whereby a colored resin layer 9 was formed in the concave parts of the transparent resin layer 4. A coating amount thereof was 1.5 g/m². Next, the ink composition used for forming the colored resin layer 9 described above was coated thereon to form a primer layer 5 (2.5 g/m²).

Next, a composition was prepared by adding to the ionizing radiation-curable resin composition used in Example 2-2, 10 parts by mass of silica (oil absorption: 200 to 300 ml/100 g, apparent specific gravity: 0.08 to 0.16 g/cm³) having an average particle diameter of 5 μm, 5 parts by mass of silica (oil absorption: 0 to 50 ml/100 g, apparent specific gravity: 0.45 to 0.85 g/cm³) having an average particle diameter of 4 μm and 5 parts by mass of wax (aliphatic wax, melting point: 110 to 200° C.) each based on 100 parts by mass of the caprolactone base urethane acrylate contained in the above resin composition, and it was used to form a coating film by gravure coating.

Then, the coating film described above was cross-linked and cured by irradiating with an electron beam on the conditions of 175 keV and 5 Mrad (50 kGy), whereby a surface protective layer (5 g/m²) was formed to obtain a sheet. A thickness of the surface protective layer was 5 μm.

Comparative Example 2-1

A sheet was prepared in the same manner as in Example 2-2, except that in Example 2-2, the silicate compound contained in the ionizing radiation-curable resin composition was changed to ethyl silicate (Ethyl Silicate 28 (trade name), a monomer, manufactured by COLCOAT CO., Ltd.).

Comparative Example 2-2

A sheet was prepared in the same manner as in Example 2-2, except that in Example 2-2, the silicate compound contained in the ionizing radiation-curable resin composition was changed to ethyl silicate (Ethyl Silicate 48 (trade name), a decamer, manufactured by COLCOAT CO., Ltd.).

Comparative Example 2-3

A sheet was prepared in the same manner as in Example 2-2, except that in Example 2-2, the silicate compound contained in the ionizing radiation-curable resin composition was removed.

TABLE 3

| | | | Example | | | | Comparative Example | | |
|---|---|---|---|---|---|---|---|---|---|
| | | | 2-1 | 2-2 | 2-3 | 2-4 | 2-1 | 2-2 | 2-3 |
| Base material | Transparent polypropylene resin (no antistatic agent) | | ○ | ○ | — | — | ○ | ○ | ○ |
| | Transparent polypropylene resin (antistatic agent contained) | | — | — | ○ | — | — | — | — |
| | Colored polypropylene resin | | — | — | — | ○ | — | — | — |
| Coating agent | Resin | Polyether base | 100 | — | — | — | — | — | — |
| | | Caprolactone base | — | 100 | 100 | 100 | 100 | 100 | 100 |
| | Silicate compound | Reactive functional group present | 10 | 10 | 10 | 10 | — | — | — |
| | | Ethyl silicate (monomer) | — | — | — | — | 10 | — | — |
| | | Ethyl silicate (decamer) | — | — | — | — | — | 10 | — |
| | UV absorber | Triazine base | 2 | 2 | 2 | 2 | 2 | 2 | 2 |
| | Light stabilizer | Hindered amine base | 6 | 6 | 6 | 6 | 6 | 6 | 6 |
| Evaluation | Self-cleaning property | | ○ | ○ | ◉ | ○ | X | ○ | X |
| | Persistence of self-cleaning property | | ○ | ◉ | ◉ | ○ | X | Δ | X |
| | Warm water whitening resistance | | ○ | ○ | ○ | ○ | ○ | Δ | ○ |
| | Surface resistivity (Ω/□) | | $10^{14}$ | $10^{14}$ | $10^{10}$ | $10^{14}$ | $10^{14}$ | $10^{14}$ | $10^{14}$ |
| | Charge decay rate half-time (second) | | $3 \times 10^4$ or more | $3 \times 10^4$ or more | 3 to $5 \times 10^4$ | $3 \times 10^4$ or more | $3 \times 10^4$ or more | $3 \times 10^4$ or more | $3 \times 10^4$ or more |
| | Weatherability | | Δ | ○ | ○ | ○ | ○ | ○ | ○ |
| | Weatherability adhesive property | | Δ | ○ | ○ | ○ | ○ | ○ | ○ |
| | Stickiness | | ○ | ○ | ○ | ○ | ○ | Δ | ○ |
| | Solvent resistance | | ○ | ○ | ○ | ○ | Δ | Δ | ○ |
| | Yellowing | | ○ | ○ | ○ | ○ | ○ | ○ | ○ |
| | Scratch resistance | | ○ | ○ | ○ | ○ | ○ | ○ | ○ |
| | Transparency | | ○ | ○ | ○ | — | ○ | Δ | ○ |

Remark: all the values of the coating agents show parts by mass.

3. Coating Composition 3 and Sheet 3

Evaluation Methods:

(3-1) Evaluation of Self-Cleaning Property (Initial Performance) and Persistence Thereof:

The films obtained in the examples and the comparative examples were set outdoors toward the south at a gradient of 45°. Then, an adhesion and deposition state of contaminants on the surface was evaluated according to the following criteria to set it to evaluations of the initial performances. Also, the films obtained in the examples and the examples were subjected to an outdoor exposure test in which they were set outdoors toward the south at a gradient of 45° and then left standing for 3 months. Then, an adhesion and deposition state of contaminants on the surface was evaluated according to the following criteria to set it to evaluations of a persistence thereof:

⊚: adhesion and deposition of contaminants were not observed at all

○: adhesion and deposition of contaminants were scarcely observed

Δ: adhesion and deposition of contaminants were slightly observed, but problems were not involved practically X: adhesion and deposition of contaminants were notably observed (3-2) Evaluation of Visible Light Transmission Property (Initial Performance) and Persistence Thereof:

the visible light transmission factors of the films obtained in the examples and the comparative examples were measured according to JIS K7361-1 (test method for a whole transmission factor of a plastic-transparent material), and they were evaluated as a visible light transmission factor (initial performance) according to the following criteria. Further, the sheets obtained in the examples and the comparative examples were subjected to an outdoor exposure test in which they were set outdoors toward the south at a gradient of 45° and then left standing for 3 months. Then, the sheets were evaluated in the same manner as described above to set it to evaluation of a persistence of the visible light transmission factor.

⊚: visible light transmission factor is 80% or more

○: visible light transmission factor is 70% or more and less than 80%

Δ: visible light transmission factor is 50% or more and less than 70%

X: visible light transmission factor is less than 50%

(3-3) UV Ray Blocking Persistence:

The films obtained in the examples and the comparative examples were set in Metal Weather manufactured by DAIPLA WINTES Co., Ltd. and subjected to a weatherability test in which they were left standing on light conditions (illuminance: 60 mW/cm$^2$, black panel temperature: 63° C., humidity in the layer: 50% RH) for 20 hours, on dew condensation conditions (illuminance: 0 mW/cm$^2$, black panel temperature: 30° C., humidity in the layer: 98% RH) for 4 hours and then on a water spraying condition (10 seconds before and after the dew condensation conditions) for 800 hours. Then, a UV ray cutting rate thereof in 340 nm was measured by means of a spectrophotometer (U-4000 (model number), manufactured by Hitachi High-Technologies Corporation) and evaluated according to the following criteria to set it to evaluation of the UV ray blocking persistence:

⊚: UV ray cutting rate is 95% or more

○: UV ray cutting rate is 90% or more and less than 95%

Δ: UV ray cutting rate is 70% or more and less than 90

X: UV ray cutting rate is less than 70%

(3-4) Harmful Insect Activity Inhibiting Effect:

The films obtained in the examples and the comparative examples were used, and movement of harmful insects in a plastic house was visually observed and evaluated according to the following criteria:

⊚: harmful insects scarcely moved

○: harmful insects moved slightly

X: harmful insects moved actively (3-5) Evaluation of Weatherability (Evaluation of Appearance):

The films obtained in the examples and the comparative examples were set in Metal Weather (manufactured by DAIPLA WINTES Co., Ltd.) and subjected to a weatherability test in which they were left standing on light conditions (illuminance: 60 mW/cm$^2$, black panel temperature: 63° C., humidity in the layer: 50% RH) for 20 hours, on dew condensation conditions (illuminance: 0 mW/cm$^2$, black panel temperature: 30° C., humidity in the layer: 98% RH) for 4 hours and on a water spraying condition (10 seconds before and after the dew condensation conditions) for 800 hours. After the above test, the films were held for 2 days on the conditions of 25° C. and 50% RH, and then an appearance of cracks and whitening on a surface of the sheet was evaluated according to the following criteria:

⊚: appearance change was not observed at all

○: appearance change was scarcely observed

Δ: appearance change was slightly observed, but problems were not involved practically X: appearance change was notably observed (3-6) Evaluation of Tensile Strength after Stretched Over a Long Period (Evaluation of Weatherability Holding Property):

The films obtained in the examples and the comparative examples were set in Eye Super UV Tester (manufactured by Iwasaki Electric Co., Ltd.), and the films were subjected to a weatherability test in which they were left standing on light conditions (illuminance: 60 mW/cm$^2$, black panel temperature: 63° C., humidity in the layer: 50% RH) for 20 hours, on dew condensation conditions (illuminance: 0 mW/cm$^2$, black panel temperature: 30° C., humidity in the layer: 98% RH) for 4 hours and on a water spraying condition (10 seconds before and after the dew condensation conditions) for 100 hours. Then, a tensile strength of the films was measured according to JIS K6732 by means of a tensilon universal test instrument (RTC-1250A type, manufactured by Orientec Electric Co., Ltd.) to evaluate a proportion of the tensile strength as compared with that before the above weatherability test according to the following criteria:

⊚: 80% or more

○: 60% or more and less than 80%

Δ: 30% or more and less than 60%

X: less than 30%

(3-7) Evaluation of Heat Fusion Property:

The films obtained in the examples and the comparative examples were pressed (thermally fused) for 1 minute on the conditions of 160° C. and 2.0 kgf/cm$^2$ with the faces of the coating layers B being opposite, and then the T type peeling strengths thereof were measured according to JIS K6854-3 by means of the tensilon universal test instrument (RTC-1250A type, manufactured by Orientec Electric Co., Ltd.) to evaluate them according to the following criteria:

⊚: 20N or more

○: 10N or more and less than 20N

Δ: 3N or more and less than 10N

X: less than 3N (3-8) Evaluation of Drip-Proof Property (Initial Performance) and Persistence Thereof:

The films obtained in the examples and the comparative examples were used to measure contact angles thereof with water by means of a contact angle meter (CA-X type (model number), manufactured by Kyowa Interface Science Co., Ltd.), and they were evaluated according to the following criteria. Further, the films obtained in the examples and the comparative examples were dipped in warm water of 40° C. for 1 month and then naturally dried at 25° C. for 24 hours, and the films were evaluated in the same manner as described above to set it to evaluation of a persistence of the drip-proof property.
⊚: contact angle is less than 50°
○: contact angle is 50° or more and less than 60°
Δ: contact angle is 60° or more and less than 75°
X: contact angle is 75° or more

Example 3-1

A resin film comprising a transparent polypropylene resin (thickness: 100 μm) was prepared as the base material. A surface and a rear face thereof were subjected to corona discharge treatment, and then a composition for forming a primer layer having the following composition was coated (2.5 g/m²) on one face thereof to form a primer layer (thickness: 2 μm). Next, an ionizing radiation-curable resin composition containing a silicate compound having a reactive functional group, a UV absorber and a light stabilizer which had the following composition was prepared to form a coating film by a gravure coating method, and the coating film described above was cross-linked and cured by irradiating with an electron beam on the conditions of 175 keV and 5 Mrad (50 kGy), whereby a surface protective layer (10 g/m²) was formed.

The sheet thus obtained was evaluated for the items described above, and the evaluation results thereof are shown in Table 4.

Composition of Resin Composition for Forming a Primer Layer:

It is a composition obtained by mixing a resin composition and a curing agent each shown below in a proportion of 100:5 (mass ratio).

Resin Composition:

| | |
|---|---|
| Polycarbonate base urethane/acryl copolymer resin | 100 parts by mass |
| Hydroxyphenyltriazine base UV absorber (Tinuvin 400 (trade name), manufactured by BASF Japan Ltd.) | 20 parts by mass |
| Hindered amine base light stabilizer (Tinuvin 123 (trade name), manufactured by BASF Japan Ltd.) | 15 parts by mass |
| Silica (average particle diameter: 5 μ) | 10 parts by mass |

Curing Agent:
Hexamethylenediisocyanate
Composition of Ionizing Radiation-Curable Resin Composition:

| | |
|---|---|
| Caprolactone base urethane acrylate oligomer (trifunctional, weight average molecular weight: 1200) | 100 parts by mass |
| Silicate compound represented by Chemical Formula (4) described above which has a vinyl group at an end | 5 parts by mass |
| Triazine base UV absorber (Tinuvin 479 (trade name), 2-(2-hydroxy-4-[1-octyloxycarbonylethoxy]phenyl)-4,6-bis(4-phenylphenyl)-1,3,5-triazine, manufactured by BASF Japan Ltd.) | 6 parts by mass |
| Light stabilizer having a reactive functional group (trade name: Sanol LS-3410, 1,2,2,6,6-pentamethyl-4-piperidinyl methacrylate, manufactured by BASF Japan Ltd.) | 6 parts by mass |

Example 3-2

A resin film comprising a transparent polypropylene resin (thickness: 100 μm) was prepared as the base material. A surface and a rear face thereof were subjected to corona discharge treatment, and then the composition for forming a primer layer used in Example 3-1 was coated (2.5 g/m²) on one face thereof to form a primer layer (thickness: 2 μm). Next, the ionizing radiation-curable resin composition containing a silicate compound having a reactive functional group, a UV absorber and a light stabilizer used in Example 3-1 was prepared to form a coating film by a gravure coating method, and the coating film described above was cross-linked and cured by irradiating with an electron beam on the conditions of 175 keV and 5 Mrad (50 kGy), whereby a surface protective layer (10 g/m²) was formed. Further, a coating composition containing silica particles which had the following composition was prepared, and the above coating composition was coated on a face opposite to the surface protective layer described above to form a coating film by a gravure coating method. The coating film described above was cross-linked and cured by irradiating with an electron beam on the conditions of 175 keV and 5 Mrad (50 kGy), whereby a rear surface coating layer (1 g/m²) was formed to obtain a sheet having coating layers on both surfaces.

The sheet thus obtained was evaluated for the items described above, and the evaluation results thereof are shown in Table 4.

Composition of Coating Agent:

| | |
|---|---|
| Urethane acrylate base oligomer (trifunctional, weight average molecular weight: 1200) | 10 parts by mass |
| Silica sol (IPA-ST (trade name), average primary particle diameter: 5 to 15 nm, IPA dispersion, solid matter content: 15%, manufactured by Nissan Chemical Industries, Ltd. | 100 parts by mass |

Example 3-3

A sheet was obtained in the same manner as in Example 3-1, except that in Example 3-1, the hydrophilizing agent was changed from the silicate compound having a vinyl group at an end to non-reactive alkyl silicate 3-1 (MS-56S (trade name), manufactured by Mitsubishi Chemical Corporation, an average hexadecamer (mixture of a tetradecamer to an octadodecamer) of alkyl silicate in which all of $R^{12}$ to $R^{15}$ in Formula (3) described above are methyl, weight average molecular weight: 1500 to 1900).

The film thus obtained was evaluated for the items described above, and the evaluation results thereof are shown in Table 4.

Example 3-4

A sheet was obtained in the same manner as in Example 3-1, except that in Example 3-1, 10 parts by mass of a benzotriazole base UV absorber (Tinuvin 109 (trade name), manufactured by BASF Japan Ltd.) was added further to the ionizing radiation-curable resin composition.

The sheet thus obtained was evaluated for the items described above, and the evaluation results thereof are shown in Table 4.

Example 3-5

A sheet was obtained in the same manner as in Example 3-1, except that in Example 3-1, the hydrophilizing agent was changed to alkyl silicate 3-2 (MS-56 (trade name), manufactured by Mitsubishi Chemical Corporation, an average decamer (mixture of a decamer to a dodecamer) of alkyl silicate in which all of $R^{12}$ to $R^{15}$ in Formula (3) described above are methyl, weight average molecular weight: 1100 to 1300, manufactured by Mitsubishi Chemical Corporation).

The sheet thus obtained was evaluated for the items described above, and the evaluation results thereof are shown in Table 4.

Example 3-6

A sheet was obtained in the same manner as in Example 3-1, except that in Example 3-1, the hydrophilizing agent was changed to alkyl silicate 3-3 (Methyl Silicate 53A (trade name), an average heptamer of alkyl silicate in which all of $R^{12}$ to $R^{15}$ in Formula (3) described above are methyl, weight average molecular weight: 789, manufactured by COLCOAT CO., Ltd.).

The sheet thus obtained was evaluated for the items described above, and the evaluation results thereof are shown in Table 4.

Example 3-7

A sheet was obtained in the same manner as in Example 3-1, except that in Example 3-1, the hydrophilizing agent was changed to alkyl silicate 3-4 having methoxy and ethoxy (EMS-485 (trade name), an average decamer of alkyl silicate in which $R^{12}$ and $R^{13}$ in Formula (3) described above are methyl and in which $R^{14}$ and $R^{15}$ are ethyl, weight average molecular weight: 1300, manufactured by COLCOAT CO., Ltd.).

The sheet thus obtained was evaluated for the items described above, and the evaluation results thereof are shown in Table 4.

Comparative Example 3-1

A sheet was obtained in the same manner as in Example 3-1, except that in Example 3-1, the surface protective layer was not provided.

The sheet thus obtained was evaluated for the items described above, and the evaluation results thereof are shown in Table 4.

Comparative Example 3-2

A sheet was obtained in the same manner as in Example 3-1, except that in Example 3-1, the ionizing radiation-curable resin composition was changed from the caprolactone base urethane acrylate to a urethane acrylate base oligomer (hexafunctional, weight average molecular weight: 2000).

The sheet thus obtained was evaluated for the items described above, and the evaluation results thereof are shown in Table 4.

Comparative Example 3-3

A sheet was obtained in the same manner as in Example 3-1, except that in Example 3-1, a resin composition obtained by removing the silicate compound having a vinyl group at an end from the ionizing radiation-curable resin composition was used.

The sheet thus obtained was evaluated for the items described above, and the evaluation results thereof are shown in Table 4.

TABLE 4

| | | | Example | | | | | | | Comparative Example | | |
|---|---|---|---|---|---|---|---|---|---|---|---|---|
| | | 3-1 | 3-2 | 3-3 | 3-4 | 3-5 | 3-6 | 3-7 | 3-1 | 3-2 | 3-3 |
| Ionizing radiation-curable resin composition | | | | | | | | | | | |
| Caprolactone base urethane acrylate | | 100 | 100 | 100 | 100 | 100 | 100 | 100 | — | — | 100 |
| Hexafunctional urethane acrylate | | — | — | — | — | — | — | — | — | 100 | — |
| Silicate compound | Having reactive functional group | 5 | 5 | — | 5 | — | — | — | — | 5 | — |
| | Alkyl silicate 3-1 | — | — | 5 | — | — | — | — | — | — | — |
| | Alkyl silicate 3-2 | — | — | — | — | 5 | — | — | — | — | — |
| | Alkyl silicate 3-3 | — | — | — | — | — | 5 | — | — | — | — |
| | Alkyl silicate 3-4 | — | — | — | — | — | — | 5 | — | — | — |
| UV absorber | Triazine base | 6 | 6 | 6 | 6 | 6 | 6 | 6 | — | 6 | 6 |
| | Benzotiazole base | — | — | — | 10 | — | — | — | — | — | — |
| Light stabilizer | Reactive hindered amine base | 6 | 6 | 6 | 6 | 6 | 6 | 6 | — | 6 | 6 |
| Coating agent | | | | | | | | | | | |
| Trifunctional urethane acrylate | | — | 10 | — | — | — | — | — | — | — | — |
| Silica sol (solid matter content: 15%): drip-proof agent | | — | 100 | — | — | — | — | — | — | — | — |
| Evaluation | Self-cleaning performance (initial) | ○ | ○ | ◎ | ○ | ◎ | ○ | ○ | Δ | ○ | ○ |
| | Persistence of self-cleaning performance | ◎ | ◎ | ○ | ◎ | ○ | ○ | ○ | X | ◎ | ◎ |
| | Visible light transmission property (initial) | ○ | ○ | ○ | ○ | ○ | ○ | ○ | ○ | ○ | ○ |

TABLE 4-continued

|  | Example | | | | | | | Comparative Example | | |
|---|---|---|---|---|---|---|---|---|---|---|
|  | 3-1 | 3-2 | 3-3 | 3-4 | 3-5 | 3-6 | 3-7 | 3-1 | 3-2 | 3-3 |
| Persistence of visible light transmission property | ◎ | ◎ | ○ | ◎ | ○ | ○ | ○ | X | ◎ | ◎ |
| UV ray blocking persistence | ○ | ○ | ○ | ○ | ○ | ○ | ○ | X | ○ | ○ |
| Harmful insect activity inhibiting effect | ○ | ○ | ○ | ◎ | ○ | ○ | ○ | X | ○ | ○ |
| Weatherability (appearance) | ○ | ○ | ○ | ◎ | ○ | ○ | ○ | X | △ | ○ |
| Tensile strength after stretched over a long period | ○ | ○ | ○ | ◎ | ○ | ○ | ○ | X | △ | ○ |
| Thermal fusion property | ○ | ○ | ○ | ○ | ○ | ○ | ○ | X | ○ | ○ |
| Drip-proof property (initial) | — | ○ | — | — | — | — | — | — | — | ○ |
| Persistence of drip-proof property | — | ○ | — | — | — | — | — | — | — | △ |

Remark: all the values of the coating agents show parts by mass.

4. Coating Composition 4 and Sheet 4

Examples 4-1 to 4-3 and Comparative Examples 4-1 to 4-5

Preparation of Sheets:

A resin sheet comprising a transparent polypropylene resin (thickness: 80 μm) was prepared as the base material.

A surface and a rear face thereof were subjected to corona discharge treatment, and then a primer agent was coated on the above surface to form a primer layer (thickness: 2 μm, 2.5 g/m$^2$). The primer agent was a mixture of 100 parts by mass of a resin composition and 5 parts by mass of hexamethylenediisocyanate (curing agent), and the resin composition described above was a mixture of a polycarbonate base urethane acryl copolymer, acrylpolyol, a triazine base UV absorber (15% by mass) and a hindered amine base light stabilizer (3% by mass).

Next, 8 kinds of coating compositions were prepared by mixing a base resin, an oil repellent agent and a hydrophilizing agent as shown in the following Table 4-1. Then, each coating composition was coated on the primer layer by a gravure coating method. Thereafter, the coating film was cross-linked and cured by irradiating with an electron beam on the conditions of 175 keV and 5 Mrad (50 kGy), whereby a surface protective layer (5 g/m$^2$) having a thickness of 5 μm was formed to obtain a sheet.

Evaluation of Sheets:

A self-cleaning property, a self-cleaning effect developing rate, an abrasion resistance, a warm water resistance, a weatherability and a scratch resistance of the respective sheets were checked. The respective test methods and evaluation criteria are shown below.

Self-Cleaning Property:

Test method: an outdoor exposure test (the sheets were left standing outdoors (toward the south at a gradient of 45°) for 2 to 3 months) was carried out. Then, the appearances of the respective sheets were observed to evaluate an adhesion and deposition degree of contaminants:

○: adhesion and deposition of contaminants were not observed

△: adhesion of contaminants was observed, but deposition thereof was not observed X: adhesion and deposition of contaminants were observed Self-Cleaning Effect Developing Rate:

Test method: the sheets were left standing indoors, and then time passing until a hydrophilicity of the respective sheets was developed was evaluated:

○: within 1 week

△: 1 week or longer and shorter than 2 months

X: 2 months or longer

Abrasion Resistance:

Test method: the sheets were subjected to a rubbing test with a gauze (load: 1500 g, 50 reciprocations), and then a hydrophilic performance thereof was evaluated:

○: no change

△: slightly reduced

X: the performance was lost

Warm Water Resistance:

Test method: the sheets were dipped in warm water of 80° C. for 3 days, and the appearances of the respective sheets were evaluated:

○: no appearance change

△: slightly whitened

X: notably whitened

Weatherability:

Test method: the sheet was put in S-W.O.M. (manufactured by Suga Test Instruments Co., Ltd.: test conditions are based on JIS A1415), and the appearances of the respective sheets were observed after 4000 hours passed:

○: no appearance change

△: slightly changed

X: notably changed

Scratch Resistance:

Test method: after a nail marling test (rubbing the sheet in 20 reciprocations by nail), the appearances of the respective sheets were evaluated:

○: no appearance change

△: no scratches were observed, but gloss change was observed

X: scratches were observed

TABLE 5

| | | Example | | | Comparative Example | | | | | |
|---|---|---|---|---|---|---|---|---|---|---|
| | | 4-1 | 4-2 | 4-3 | 4-1 | 4-2 | 4-3 | 4-4 | 4-5 | 4-6 |
| Base component | Base 1 | 100 | 100 | — | 100 | 100 | 100 | 100 | — | — |
| | Base 2 | — | — | 100 | — | — | — | — | — | — |
| | Base 3 | — | — | — | — | — | — | — | 100 | — |
| | Base 4 | — | — | — | — | — | — | — | — | 100 |
| Oil repellent agent | Fluorine base resin | — | — | — | — | 20 | — | 20 | — | — |
| Hydrophilizing agent | Methyl silicate | 10 | 5 | 10 | — | — | — | — | 10 | 10 |
| | Ethyl silicate | — | 5 | — | — | — | 10 | — | — | — |
| UV absorber | Triazine base | Contained | Contained | Contained | Contained | Contained | Contained | Contained | Not contained | Not contained |
| Light stabilizer | Hindered amine base | Contained | Contained | Contained | Contained | Contained | Contained | Contained | Not contained | Not contained |
| Evaluation | Self-cleaning property | ○ | ○ | ○ | X | X | Δ | X | ○ | Δ |
| | Self-cleaning effect developing rate | ○ | ○ | ○ | X | X | X | X | ○ | ○ |
| | Abrasion resistance | ○ | ○ | ○ | ○ | ○ | ○ | ○ | X | ○ to Δ |
| | Warm water resistance | ○ | ○ | ○ | ○ | ○ | ○ | ○ | X | Δ |
| | Weatherability | ○ | ○ | Δ | ○ | ○ | ○ | ○ | X | ○ to Δ |
| | Scratch resistance | ○ | ○ | ○ | ○ | ○ | ○ | ○ | X | ○ to Δ |

In Table 5, the base 1 was caprolactone base urethane acrylate, and trifunctional urethane acrylate having a weight average molecular weight of 1200 was used as the above caprolactone base urethane acrylate. The base 2 was non-caprolactone base urethane acrylate, and 3.9 functional urethane acrylate having a weight average molecular weight of 2000 was used therefor.

The base 3 is a polyester base one-component liquid coating agent (conventional product), and ASCA BAKE NEO (trade name) manufactured by Kansai Paint Co., Ltd. was used therefor. Also, the base 4 is an acryl urethane base two-component liquid coating agent (conventional product), and SUPER RETAN 1000 (trade name) manufactured by Kansai Paint Co., Ltd. was used therefor.

Methyl Silicate 53A (trade name) manufactured by COLCOAT CO., Ltd. (an average heptamer of alkyl silicate in which all of $R^{12}$ to $R^{15}$ in Formula (3) described above are methyl, a weight average molecular weight: 789) was used as the methyl silicate in Examples 1 and 3 and Comparative Examples 4 and 5. EMS-485 (trade name) manufactured by COLCOAT CO., Ltd. (an average decamer of alkyl silicate in which $R^{12}$ and $R^{13}$ in Formula (3) described above are methyl and in which $R^{14}$ and $R^{15}$ are ethyl, weight average molecular weight: 1300) was used as the hydrophilizing agent in Example 2. Also, Ethyl Silicate 48 (trade name) manufactured by COLCOAT CO., Ltd. (decamer, molecular weight: 1400) was used as the ethyl silicate in Comparative Example 3.

Further, Lumiflon (trade name) manufactured by Asahi Glass CO., Ltd. was used as the fluorine base resin (oil repellent agent).

5. Coating Composition 5 and Sheet 5

Evaluation Methods:

(5-1) Evaluation of Self-Cleaning Performance (Initial Performance) and Persistence Thereof:

The sheets obtained in the examples and the comparative examples were set outdoors toward the south at a gradient of 45°. Then, an adhesion and deposition state of contaminants on the surface was evaluated by visual observation according to the following criteria to set it to evaluation of the initial performance. Further, the sheets obtained in the examples and the comparative examples were subjected to an outdoor exposure test in which they were set outdoors toward the south at a gradient of 45° and then left standing for 3 months. Then, an adhesion and deposition state of contaminants on the surface was evaluated by visual observation according to the following criteria to set it to evaluation of the persistence:

◎: adhesion and deposition of contaminants were not confirmed at all

○: adhesion and deposition of contaminants were scarcely observed

Δ: adhesion and deposition of contaminants were slightly observed, but problems were not involved practically X: adhesion and deposition of contaminants were notably observed (5-2) Evaluation of Warm Water Whitening Resistance:

The sheets obtained in the examples and the comparative examples were dipped in warm water of 80° C. for 7 days. An appearance of the sheet after dipped was evaluated by visual observation according to the following criteria:

◎: appearance change was not observed at all

○: appearance change was scarcely observed

Δ: appearance was slightly whitened, but problems were not involved practically

X: appearance was notably whitened (5-3) Evaluation of Weatherability (Evaluation of Appearance):

The sheets obtained in the examples and the comparative examples were set in Metal Weather manufactured by DAIPLA WINTES Co., Ltd. and subjected to a weatherability test in which they were left standing on light conditions (illuminance: 60 mW/cm², black panel temperature: 63° C., humidity in the layer: 50% RH) for 200 hours, on dew condensation conditions (illuminance: 0 mW/cm², black panel temperature: 30° C., humidity in the layer: 98% RH) for 4 hours and on a water spraying condition (10 seconds before and after the dew condensation conditions) for 800 hours. After the above test, the sheets were held for 2 days on the conditions of 25° C. and 50% RH, and then an appearance of cracks and whitening on a surface of the sheet was evaluated by visual observation according to the following criteria:

◎: appearance change was not observed at all
○: appearance change was scarcely observed
Δ: appearance change was slightly observed, but problems were not involved practically
X: appearance change was notably observed (5-4) Evaluation of Stickiness:

The sheets obtained in the examples and the comparative examples were stored for 24 hours on the condition of 80° C., and then a surface of the above sheet was touched with a finger to evaluate a stickiness thereof according to the following criteria:

◎: stickiness was not observed at all
○: stickiness was scarcely observed
Δ: stickiness was slightly observed, but problems were not involved practically
X: stickiness was notably observed (5-5) Evaluation of Solvent Resistance:

A gauze was set to a plummet of 300 g/cm² by a rubber band and impregnated with ethyl acetate. Then, the above plummet was reciprocated 50 times in a lateral direction on the surfaces of the sheets obtained in the examples and the comparative examples, and the surfaces of the sheets were evaluated by visual observation according to the following criteria:

○: change on the surface of the sheet was not observed at all
Δ: change on the surface of the sheet was slightly observed, but problems were not involved practically
X: change on the surface of the sheet was notably observed (5-6) Transparency:

The appearances of the sheets obtained in the examples and the comparative examples were visually observed and evaluated according to the following criteria:

○: haze feeling (cloudy feeling) was not observed at all
Δ: haze feeling (cloudy feeling) was slightly observed, but problems were not involved practically
X: haze feeling (cloudy feeling) was notably observed (5-7) Scratch Resistance:

The sheets obtained in the examples and the comparative examples were rubbed thereon in five reciprocations by using a steel wool on which a weight of 300 g/cm² was applied, and then the surfaces of the above sheets were evaluated by visual observation according to the following criteria:

○: change was scarcely observed on the surface
Δ: slight scratches and gloss change were observed on the surface, but problems were not involved practically
X: marked scratches were observed on the surface, and gloss change was notably observed as well

Example 5-1

A resin film comprising a transparent polypropylene resin (thickness: 80 μm) was prepared as the base material. A surface thereof was subjected to corona discharge treatment, and then a composition for forming a primer layer having the following composition was coated (2.5 g/m²) on the above surface to form a primer layer (thickness: 2 μm). Next, a coating agent having the following composition was prepared to form a coating film by a gravure coating method, and the coating film described above was cross-linked and cured by irradiating with an electron beam on the conditions of 175 keV and 5 Mrad (50 kGy), whereby a surface protective layer (5 g/m²) was formed. A thickness of the surface protective layer thus obtained was 5 μm.

The sheet thus obtained was evaluated for the items described above, and the evaluation results thereof are shown in Table 6.

Composition of Composition for Forming a Primer Layer:

It is a composition obtained by mixing a resin composition and a curing agent each shown below in a proportion of 100:5.

Resin Composition:

| | |
|---|---|
| Polycarbonate base urethane/acryl copolymer resin | 100 parts by mass |
| Hydroxyphenyltriazine base UV absorber (Tinuvin 400 (trade name), manufactured by BASF Japan Ltd.) | 15 parts by mass |
| Hindered amine base light stabilizer (Tinuvin 123 (trade name), manufactured by BASF Japan Ltd.) | 3 parts by mass |

Curing Agent:
Hexamethylenediisocyanate

Composition of Coating Agent:

| | |
|---|---|
| Caprolactone base urethane acrylate oligomer (trifunctional, weight average molecular weight: 1200) | 100 parts by mass |
| Alkyl silicate 5-1 (an average 26-mer (mixture of a 24-mer to a 28-mer) of alkyl silicate in which all of $R^1$ to $R^4$ in Formula (1) described above are methyl, weight average molecular weight: 2500 to 2900) | 10 parts by mass |
| Triazine base UV absorber (Tinuvin 479 (trade name), 2-(2-hydroxy-4-[1-octyloxycarbonylethoxy]phenyl)-4, 6-bis(4-phenylphenyl)-1,3,5-triazine, manufactured by BASF JapanLtd.) | 1 part by mass |
| Light stabilizer having a reactive functional group (trade name: Sanol LS-3410, 1,2,2,6, 6-pentamethyl-4-piperidinyl methacrylate, manufactured by BASF Japan Ltd.) | 2 parts by mass |

Example 5-2

A sheet was obtained in the same manner as in Example 5-1, except that in Example 5-1, the caprolactone base urethane acrylate oligomer contained in the coating agent was changed to a polyether base acrylate oligomer (difunctional, molecular weight: 3000). The sheet thus obtained was evaluated for the items described above, and the evaluation results thereof are shown in Table 6.

Example 5-3

A sheet was obtained in the same manner as in Example 5-1, except that in Example 5-1, the alkyl silicate 5-1 contained in the coating agent was changed to other alkyl silicate 5-2 (an average 31-mer (a mixture of a 29-mer to a 33-mer) of alkyl silicate in which all of $R^1$ to $R^4$ in Formula (1) described above are methyl, weight average molecular weight: 3000 to 3400). The sheet thus obtained was evaluated for the items described above, and the evaluation results thereof are shown in Table 6.

Example 5-4

A sheet was obtained in the same manner as in Example 5-1, except that in Example 5-1, the alkyl silicate 5-2 contained in the coating agent was changed to other alkyl silicate 5-3 (an average 24-mer (a mixture of a 22-mer to a 26-mer) of alkyl silicate in which $R^1$ and $R^3$ in Formula (1) described above are methyl and in which $R^2$ and $R^4$ are ethyl, weight average molecular weight: 2700 to 3200). The sheet thus obtained was evaluated for the items described above, and the evaluation results thereof are shown in Table 6.

Example 5-5

A sheet was obtained in the same manner as in Example 5-1, except that in Example 5-1, the alkyl silicate 5-1 contained in the coating agent was changed to other alkyl silicate 5-4 (an average 23-mer (a mixture of a 21-mer to a 25-mer) of alkyl silicate in which $R^1$ to $R^4$ in Formula (1) described above are ethyl, weight average molecular weight: 2900 to 3400). The sheet thus obtained was evaluated for the items described above, and the evaluation results thereof are shown in Table 6.

Comparative Example 5-1

A sheet was obtained in the same manner as in Example 5-1, except that in Example 5-1, the alkyl silicate 5-1 contained in the coating agent was changed to alkyl silicate 5-5 (MS-56 (trade name), manufactured by Mitsubishi Chemical Corporation, an average decamer (mixture of a decamer to a dodecamer) of alkyl silicate in which all of $R^1$ to $R^4$ in Formula (1) described above are methyl, weight average molecular weight: 1100 to 1300). The sheet thus obtained was evaluated for the items described above, and the evaluation results thereof are shown in Table 6.

Comparative Example 5-2

A sheet was obtained in the same manner as in Example 5-1, except that in Example 5-1, the alkyl silicate 5-1 contained in the coating agent was changed to alkyl silicate 5-6 (MS-56S (trade name), manufactured by Mitsubishi Chemical Corporation, an average hexadecamer (mixture of a tetradecamer to an octadodecamer) of alkyl silicate in which all of $R^1$ to $R^4$ in Formula (1) described above are methyl, weight average molecular weight: 1500 to 1900). The sheet thus obtained was evaluated for the items described above, and the evaluation results thereof are shown in Table 6.

Comparative Example 5-3

A sheet was obtained in the same manner as in Example 5-1, except that in Example 5-1, the alkyl silicate 5-1 contained in the coating agent was changed to the alkyl silicate 5-6 described above and that the caprolactone base urethane acrylate oligomer was changed to a polyether base acrylate oligomer (difunctional, molecular weight: 3000). The sheet thus obtained was evaluated for the items described above, and the evaluation results thereof are shown in Table 6.

Comparative Example 5-4

A sheet was obtained in the same manner as in Example 5-1, except that in Example 5-1, the alkyl silicate 5-1 contained in the coating agent was changed to alkyl silicate 5-7 (Methyl Silicate 51 (trade name), manufactured by COLCOAT CO., Ltd., an average heptamer of alkyl silicate in which all of R' to $R^4$ in Formula (1) described above are methyl, weight average molecular weight: 789). The sheet thus obtained was evaluated for the items described above, and the evaluation results thereof are shown in Table 6.

Comparative Example 5-5

A sheet was obtained in the same manner as in Example 5-1, except that in Example 5-1, the alkyl silicate 5-1 contained in the coating agent was changed to alkyl silicate 5-8 having methoxy and ethoxy (EMS-485 (trade name), manufactured by COLCOAT CO., Ltd., an average decamer of alkyl silicate in which $R^1$ and $R^3$ in Formula (1) described above are methyl and in which $R^2$ and $R^4$ are ethyl, weight average molecular weight: 1300). The sheet thus obtained was evaluated for the items described above, and the evaluation results thereof are shown in Table 6.

Comparative Example 5-6

A sheet was obtained in the same manner as in Example 5-1, except that in Comparative Example 5-4, the caprolactone base urethane acrylate oligomer contained in the coating agent was changed to a polyether base acrylate oligomer (difunctional, weight average molecular weight: 3000). The sheet thus obtained was evaluated for the items described above, and the evaluation results thereof are shown in Table 6.

TABLE 6

| Coating agent | | Example | | | | | Comparative Example | | | | | |
|---|---|---|---|---|---|---|---|---|---|---|---|---|
| | | 5-1 | 5-2 | 5-3 | 5-4 | 5-5 | 5-1 | 5-2 | 5-3 | 5-4 | 5-5 | 5-6 |
| Caprolactone base urethane acrylate | | 100 | — | 100 | 100 | 100 | 100 | 100 | — | 100 | 100 | — |
| Polyether base urethane acrylate | | — | 100 | — | — | — | — | — | 100 | — | — | 100 |
| Alkyl silicate | Alkyl silicate 5-1 | 10 | 10 | — | — | — | — | — | — | — | — | — |
| | Alkyl silicate 5-2 | — | — | 10 | — | — | — | — | — | — | — | — |
| | Alkyl silicate 5-3 | — | — | — | 10 | — | — | — | — | — | — | — |
| | Alkyl silicate 5-4 | — | — | — | — | 10 | — | — | — | — | — | — |
| | Alkyl silicate 5-5 | — | — | — | — | — | 10 | — | — | — | — | — |
| | Alkyl silicate 5-6 | — | — | — | — | — | — | 10 | 10 | — | — | — |
| | Alkyl silicate 5-7 | — | — | — | — | — | — | — | — | 10 | — | 10 |
| | Alkyl silicate 5-8 | — | — | — | — | — | — | — | — | — | 10 | — |
| Evaluation | Self-cleaning performance (initial) | ◎ | ◎ | ◎ | ○ | ◎ | ○ | ○ | ○ | ○ | ○ | ○ |
| | Persistence of self-cleaning performance | ◎ | ◎ | ◎ | ◎ | ◎ | Δ | Δ | Δ | Δ | Δ | Δ |
| | Warm water whitening resistance | ○ | ○ | ○ | ○ | ○ | ○ | ○ | ○ | Δ | Δ | Δ |

TABLE 6-continued

|  | Example | | | | | Comparative Example | | | | | |
| --- | --- | --- | --- | --- | --- | --- | --- | --- | --- | --- | --- |
| Coating agent | 5-1 | 5-2 | 5-3 | 5-4 | 5-5 | 5-1 | 5-2 | 5-3 | 5-4 | 5-5 | 5-6 |
| Weatherability | ○ | Δ | ○ | ○ | ○ | ○ | ○ | Δ | ○ | ○ | Δ |
| Stickiness | ○ | ○ | ○ | ○ | ○ | ○ | ○ | ○ | Δ | Δ | Δ |
| Solvent resistance | ○ | ○ | ○ | ○ | ○ | ○ | ○ | ○ | Δ | Δ | Δ |
| Transparency | ○ | ○ | ○ | ○ | ○ | ○ | ○ | ○ | Δ | Δ | Δ |
| Scratch resistance | ○ | ○ | ○ | ○ | ○ | ○ | ○ | ○ | ○ | ○ | ○ |

Remark: all the values of the coating agents show parts by mass.

It has been confirmed that the sheets obtained in Examples 5-1 to 5-3 show excellent effects in all evaluations and that they show very excellent effects in terms of particularly a self-cleaning performance (initial) and a persistence thereof. On the other hand, it has been confirmed that the sheets obtained in Comparative Examples 5-1 to 5-6 are not satisfactory in terms of a persistence of a self-cleaning performance, a warm water whitening resistance, a stickiness, a solvent resistance and a transparency and that when the higher performances are required, there is a room of improvement.

Industrial Applicability

The coating compositions of the present invention can provide sheets with a visible light transmission property and a UV ray-blocking performance in addition to an excellent self-cleaning performance and a persistence thereof, a weatherability and a persistence thereof and a transparency. Accordingly, the coating compositions and the coating films of the present invention are suitably used for applications in entrance doors and exterior materials in general housings, interiors and exteriors such as floor materials, outside walls and the like in public facilities, buildings and structures installed outdoors.

What is claimed is:

1. A coating composition comprising a caprolactone base urethane (meth)acrylate, a triazine base UV absorber and a hindered amine base light stabilizer having a reactive functional group A1, wherein a content of the triazine base UV absorber is 3 to 10 parts by mass based on 100 parts by mass of the caprolactone base urethane (meth)acrylate, wherein the reactive functional group A1 is a (meth)acryloyl group, and wherein the caprolactone base urethane (meth)acrylate is an oligomer, having a weight-average molecular weight of 1000 to 10,000.

2. The coating composition according to claim 1, further comprising a silicate compound having a reactive functional group B1 or alkyl silicate.

3. The coating composition according to claim 2, wherein the coating composition includes the silicate compound having the reactive functional group B1.

4. The coating composition according to claim 3, wherein the reactive functional group B1 is a (meth)acryloyl group.

5. The coating composition according to claim 2, wherein the coating composition includes the alkyl silicate.

6. The coating composition according to claim 1, wherein the hindered amine base light stabilizer having a reactive functional group A1 is 1,2,2,6,6,-pentamethyl-4-piperidinyl (meth)acrylate.

7. The coating composition according to claim 1, wherein content of the hindered amine base light stabilizer having a reactive functional group A1 is 3 to 10 parts by mass based on 100 parts by mass of the caprolactone base urethane (meth)acrylate.

8. A sheet having a surface protective layer formed by cross-linking and curing the coating composition according to claim 1.

9. The sheet according to claim 8, wherein it comprises at least a base material and a surface protective layer, and the above surface protective layer is provided on an outermost surface.

10. The sheet according to claim 9, wherein a primer layer is provided between a film of the base material and the surface protective layer.

11. A coating composition comprising a caprolactone base urethane (meth)acrylate, a triazine base UV absorber, a silicate compound having a reactive functional group B1 or alkyl silicate, and a hindered amine base light stabilizer having a reactive functional group A1, wherein the reactive functional group A1 is a (meth)acryloyl group, wherein the caprolactone base urethane (meth)acrylate is an oligomer, having a weight-average molecular weight of 1000 to 10,000.

* * * * *